(12) United States Patent
Tidcomb

(10) Patent No.: US 7,347,468 B1
(45) Date of Patent: Mar. 25, 2008

(54) COMBINED SHOVEL AND CLEARING TOOL ARRANGEMENT

(76) Inventor: Steven Tidcomb, 54 Parramatta Rd., Beverly, MA (US) 01915-1970

( * ) Notice: Subject to any disclaimer, the term of this patent is extended or adjusted under 35 U.S.C. 154(b) by 70 days.

(21) Appl. No.: 11/082,383

(22) Filed: Mar. 16, 2005

Related U.S. Application Data

(60) Provisional application No. 60/554,007, filed on Mar. 16, 2004.

(51) Int. Cl.
*E01H 5/02* (2006.01)
*A01B 1/20* (2006.01)

(52) U.S. Cl. .................... 294/51; 294/54.5; 294/59; 15/117

(58) Field of Classification Search ............... 294/53.5, 294/51, 54.5, 59; 37/265, 284, 285; 15/111, 15/117
See application file for complete search history.

(56) References Cited

U.S. PATENT DOCUMENTS

| | | | |
|---|---|---|---|
| 1,143,752 A * | 6/1915 | Crisman ........................ 15/111 |
| 2,126,023 A * | 8/1938 | McGoldrick ................. 15/105 |
| 2,867,827 A * | 1/1959 | Gantz ........................... 15/111 |
| 3,868,775 A * | 3/1975 | Anderson ..................... 30/329 |
| 4,153,287 A | 5/1979 | Towsend | |
| 4,264,095 A * | 4/1981 | Lemasters .................. 294/53.5 |
| 4,357,043 A | 11/1982 | Towsend | |
| 4,597,204 A * | 7/1986 | Heiden ......................... 37/285 |
| 5,309,654 A | 5/1994 | Mathis | |
| D355,075 S * | 2/1995 | Stone .......................... D4/118 |
| 5,727,829 A * | 3/1998 | Bellichak ...................... 294/51 |
| 5,779,293 A | 7/1998 | Hainer | |
| 6,944,980 B1 * | 9/2005 | Lefrancois .................... 37/285 |

* cited by examiner

*Primary Examiner*—Dean J Kramer
(74) *Attorney, Agent, or Firm*—O'Connell Law Firm

(57) ABSTRACT

A combined shovel and clearing tool with a shovel and a clearing tool member for being coupled to the shovel. The clearing tool member can be selectively retained in a usage disposition, such as relative to a leading edge of a shovel blade, and in a storage disposition, such as relative to a trailing edge of the shovel blade or relative to a handle of the shovel. The clearing tool member can be retained by, for example, a clip arrangement, an elastic tether, or a rigid arm. Bristles can project from an obverse side of the shovel blade. The handle and the blade can be reconfigurable by, for example, a relative pivoting or a selective coupling of the handle with multiple receiving portions on the blade. A universal clearing tool can be coupled to a standard shovel.

9 Claims, 31 Drawing Sheets

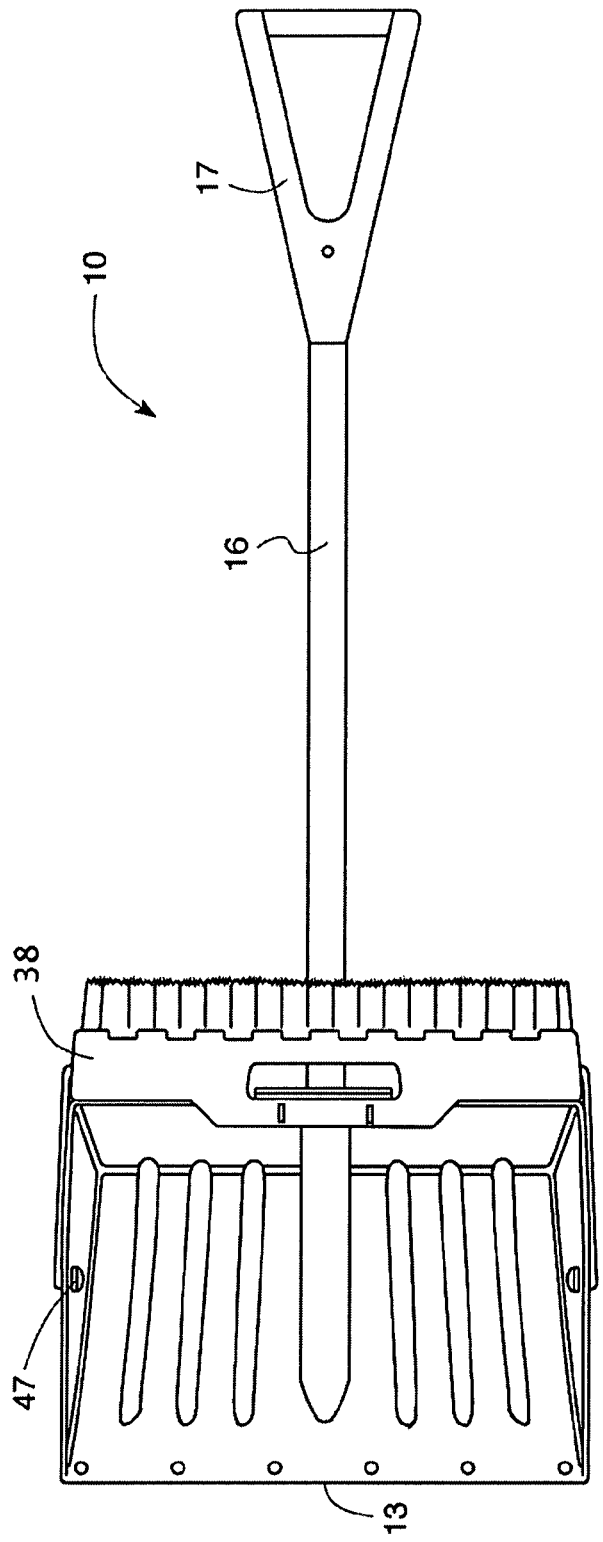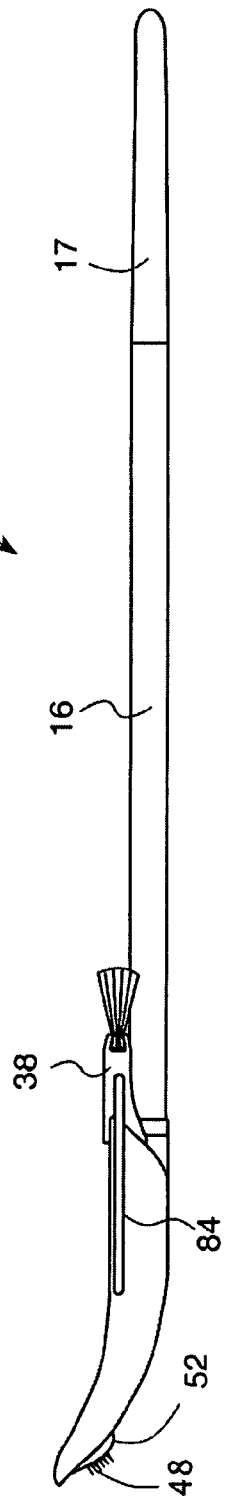
FIG. 6A
FIG. 6B

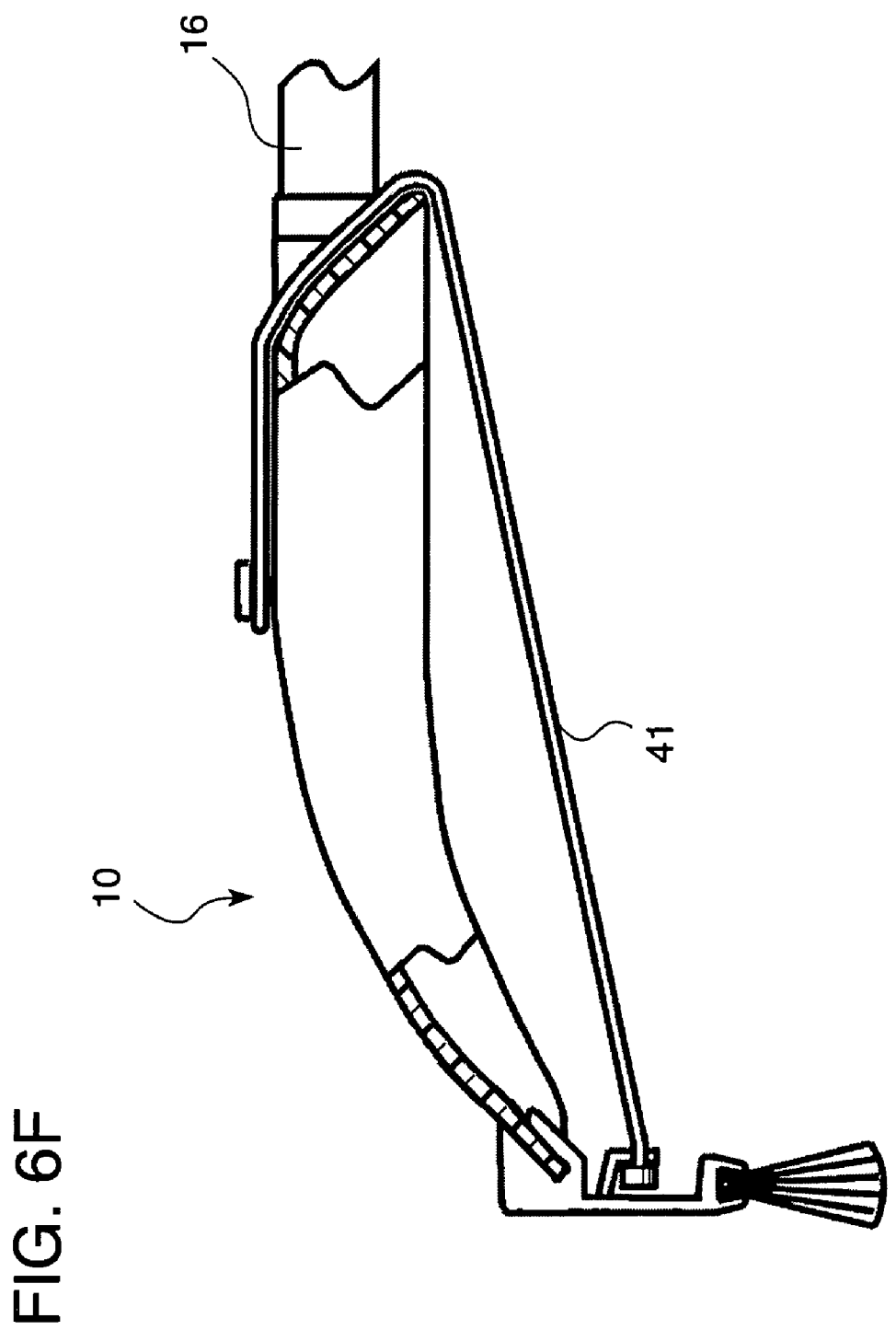

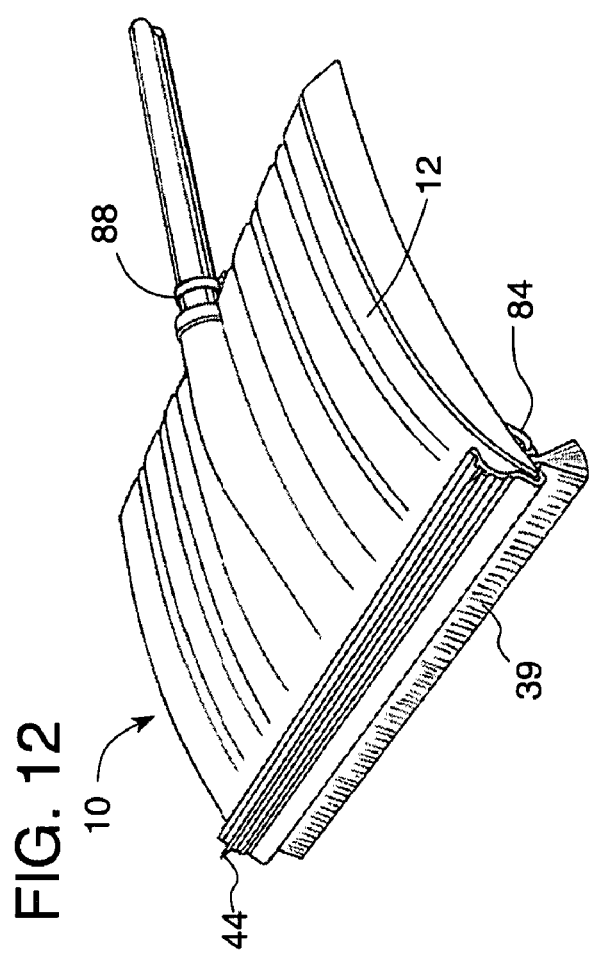
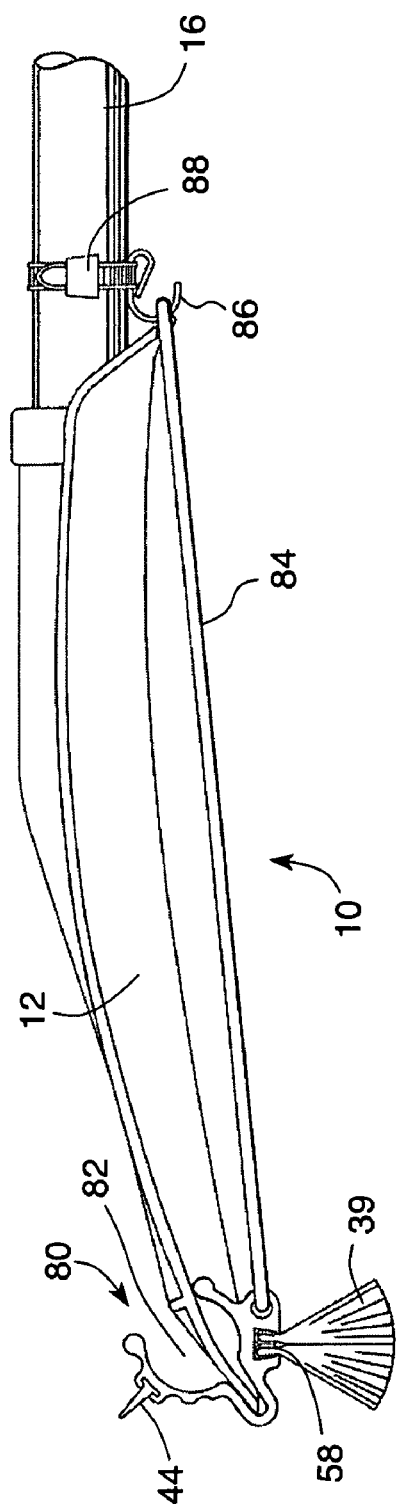

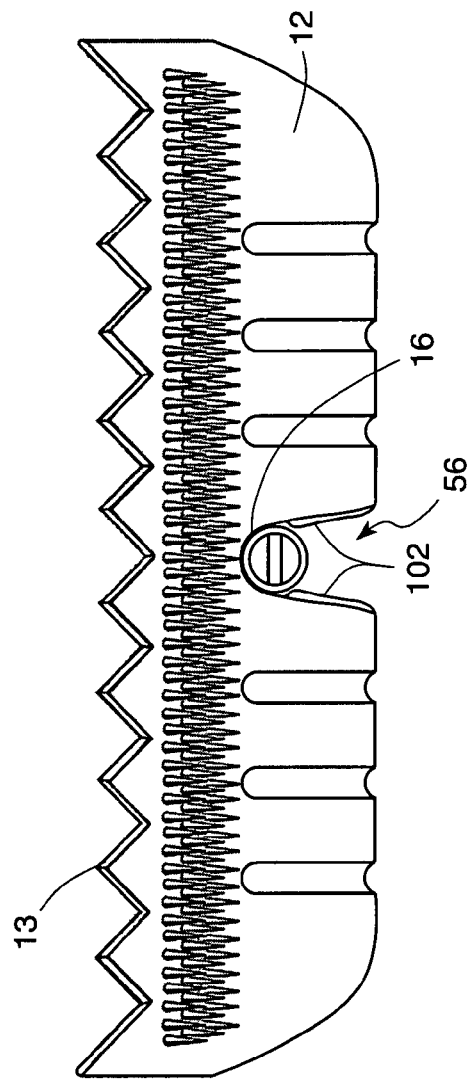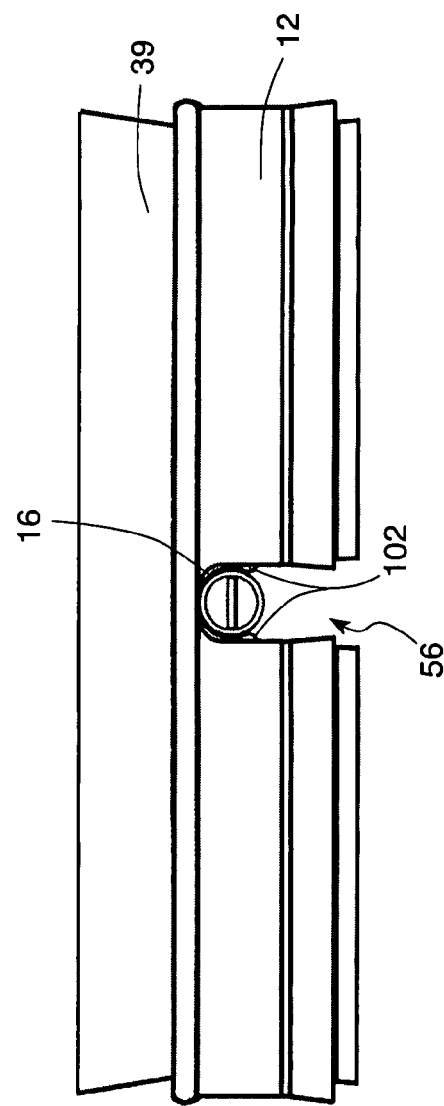
FIG. 28A
FIG. 28B

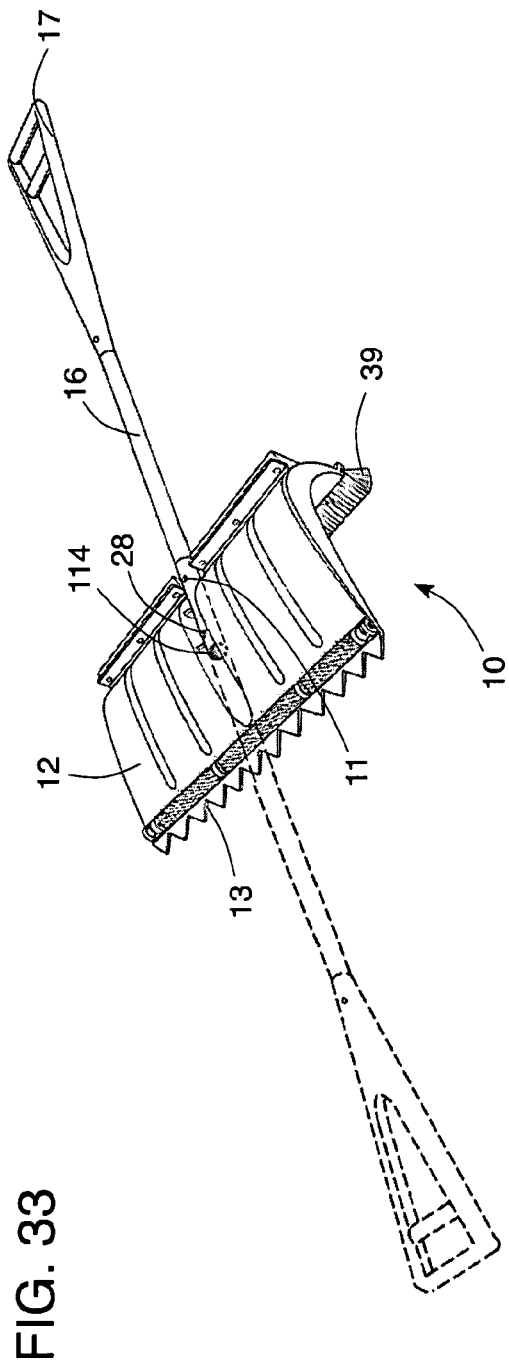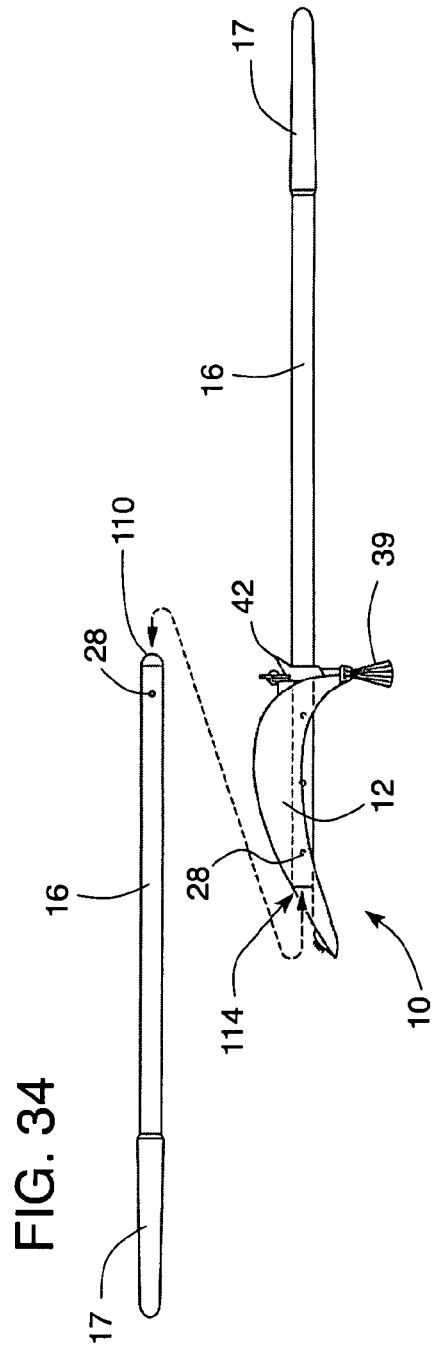

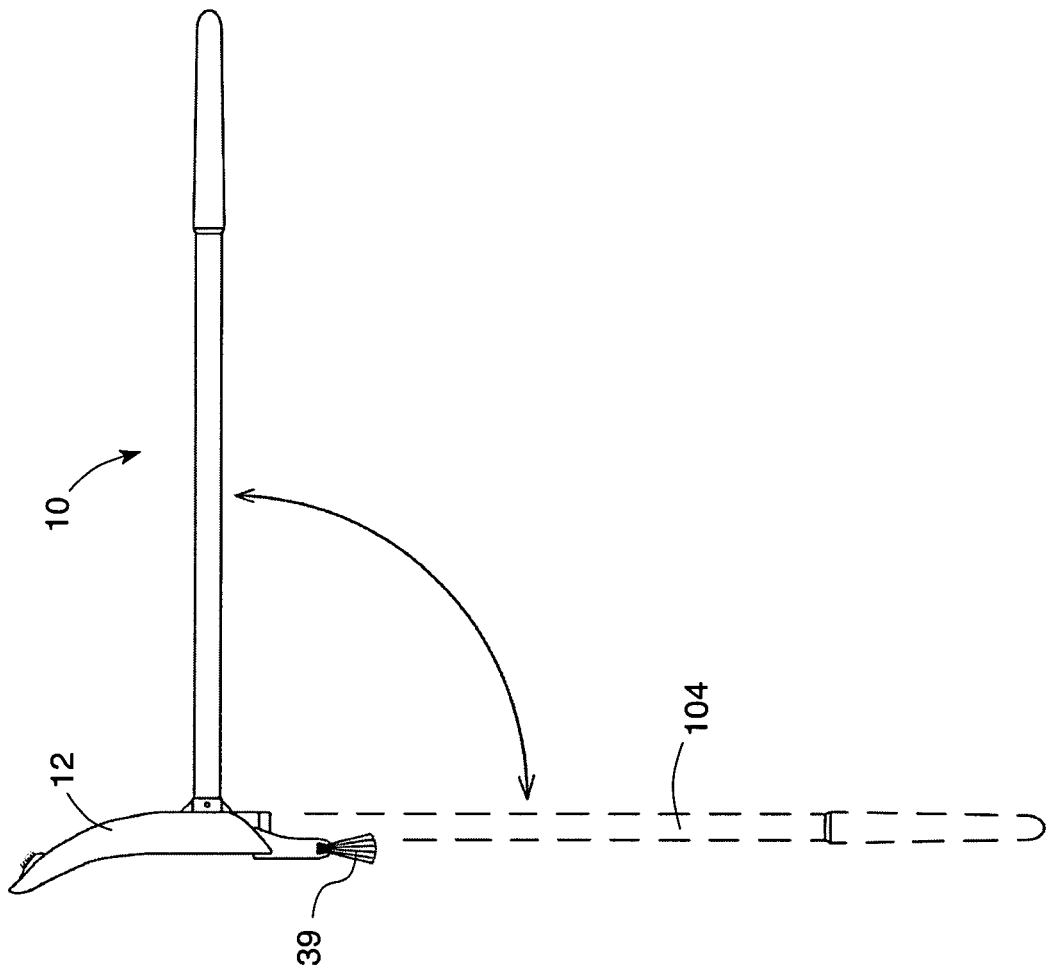

COMBINED SHOVEL AND CLEARING TOOL ARRANGEMENT

FIELD OF THE INVENTION

The present invention relates generally to hand tools. More particularly, disclosed herein is a multi-functional hand tool capable of being configured for use as a material clearing tool and as a shovel.

BACKGROUND OF THE INVENTION

Despite modern advances in snow removal including snow blowers and innumerable snow shovels and vehicle snow brushes, the strenuous work of shoveling and clearing snow from vehicles remains an unavoidable and strenuous task that is not only time-consuming but highly taxing to the human body, even endangering one's life. Recent advances in shovel design, such as lightweight plastic blades and aluminum handles have eased the task of shoveling, lifting, and throwing snow. However, even the combined prior art has done little to facilitate the pushing of a shovel's blade along a surface to be cleared.

Improvements in vehicle snow brushes, including in the form of push type brooms often with extendable and retractable handles, have made the ability to clear heavy snow accumulations from a vehicle easier than with previous arrangements, such as whisk brooms and the like. However, such devices must be designed to be stored in a compact manner inside the vehicle, which imposes limits on their structure and, as a result, their efficiency. As a result, they have typically been limited in their path width and have had poor ergonomic handle designs. The present inventor has appreciated that a more effective design could be realized by removing the requirement for storing the tool in the vehicle.

After a snowfall, a person typically begins by shoveling a path to the vehicle. Once at the vehicle, the first priority normally is to start the vehicle and its heating system to facilitate ice and snow removal. A snow broom can enable a person to access the locks and handles of the vehicle and to prevent snow on the roof and around the door from falling into the vehicle. Unfortunately, the snow broom or other snow removing tool is normally kept inside the snow-covered vehicle. Where the hand tool is not readily available, persons often resort to using his or her hands and forearms or even the shovel for clearing snow, which is inconvenient and can lead to possible damage to the vehicle. Furthermore, because the need for storing and retrieving each tool is inconvenient and time consuming, the present inventor has realized that it would be desirable for a single hand tool to serve both as a snow shovel and as a snow broom.

Even further, it will be noted that there are few tasks more exhausting than clearing snow from brick walkways, flagstone patios, cracked or broken pavement, storm grates, and similarly uneven ground surfaces. As any person who has shoveled snow will be well aware, the sliding of the shovel over an uneven ground surface can be abruptly halted as the forward edge of the shovel blade strikes a crack, bump, or other surface anomaly. The jarring stoppage of shovel progress wastes energy, fatigues and frustrates the user, and cases damage and wear to the shovel blade.

SUMMARY OF THE INVENTION

Advantageously, the present invention is founded on the most broadly stated object of providing a hand tool that overcomes the disadvantages from which prior art shovels and clearing tools, such as snow brooms, have suffered.

A more particular object of embodiments of the invention is to provide a single hand tool capable of alternatively operating as a shovel and as a clearing tool.

A related object of embodiments of the invention is to provide a combined snow shovel and snow broom arrangement that enables a user to replace multiple hand tools with a single, multifunctional hand tool.

An object of particular embodiments of the invention is to provide a combined snow shovel and snow broom arrangement that enables a transition between hand tool usages in a convenient and effective manner.

A further object of embodiments of the invention is to provide a combined snow shovel and snow broom arrangement capable of functioning as a snow broom that is efficient with an improved sweeping path, an extended reach, and, in particular constructions, an ergonomic handle configuration.

Still another object of embodiments of the invention is to provide a combined snow shovel and snow broom arrangement that facilitates the forward movement of the shovel along a ground surface notwithstanding surface irregularities that might otherwise hinder or halt forward movement.

These and in all likelihood further objects and advantages of the present invention will become obvious not only to one who reviews the present specification and drawings but also to those who experience an embodiment of the combined snow shovel and snow broom arrangement disclosed herein. However, it will be appreciated that, although the accomplishment of each of the foregoing objects in a single embodiment of the invention may be possible and indeed preferred, not all embodiments will seek or need to accomplish each and every potential advantage and function. Nonetheless, all such embodiments should be considered within the scope of the present invention.

In carrying forth these objects, one embodiment of the present invention for a combined shovel and clearing tool arrangement can provide a snow broom that can be three times larger than conventional snow brooms. The snow broom can be provided with an extra long reach handle and an ergonomic D-grip that allow a user to remove large amounts of snow from vehicles including tall vehicles in a fraction of the time and with much less effort than with prior art arrangements. The broom member can be detachable from the shovel portion for hand-held use for clearing vehicle mirrors, door locks, and the like.

When configured as a snow shovel, the combined snow shovel and snow broom arrangement can facilitate shoveling problematic surfaces by the incorporation of a strip of resilient bristles along the underside of the leading edge of the shovel blade where the shovel contacts the ground. The bristles can support the blade slightly above the surface being cleared such that the bristles can sweep the path instead of scraping it, thereby minimizing friction, blade wear, and user effort. The blade can then glide easily over bumps and irregularities while scooping the majority of the snow into the blade. The thin layer of snow not scooped up is simply swept along by the bristles. The bristles can be integrally molded with the shovel blade or fixed thereto in a bristle strip. The bristle strip can be removable and replaceable.

Embodiments are possible wherein a broom arrangement pursuant to the present invention can be crafted to couple to prior art snow shovel constructions. Furthermore, embodiments of the invention are contemplated with a removable shovel shaft for enabling improved storage and packaging. The handle portion of the combined snow shovel and broom arrangement can be interchangeable to enable a selection of a handle portion to suit the user and the grip and leverage characteristics related to the task to be accomplished.

Of course, one should remain mindful that the foregoing discussion is designed merely to outline broadly certain important features of the invention to enable a bettered understanding of the detailed description that follows and to instill a better appreciation of the inventors' contribution to the art. Before any particular embodiment of the invention is explained in detail, it must be made clear that the following details of construction, descriptions of geometry, and illustrations of inventive concepts are mere examples of the many possible manifestations of the invention.

BRIEF DESCRIPTION OF THE DRAWINGS

In the accompanying drawings:

FIG. 6A is a view in front elevation of a further variation of the combined shovel and broom arrangement in a shovel configuration;

FIG. 6B is a view in side elevation of the combined shovel and broom arrangement of FIG. 6A, again in a shovel configuration;

FIG. 6F is a perspective view of an even further combined shovel and broom arrangement in a broom configuration;

FIG. 12 is a perspective view of an obverse side of a combined shovel and broom arrangement in a broom configuration;

FIG. 13 is a cross sectional view in side elevation of the combined shovel and broom arrangement of FIG. 12;

FIGS. 28A and 28B are partially sectioned views in front and rear elevation of a further combined shovel and broom arrangement;

FIG. 33 is a perspective view of still another combined shovel and broom arrangement;

FIG. 34 is a view in side elevation of the combined shovel and broom arrangement of FIG. 33 in alternative configurations;

FIG. 39 is a view in side elevation of the combined shovel and broom arrangement of FIG. 37.

DETAILED DESCRIPTION OF PREFERRED EMBODIMENTS

As is the case with many inventions, the present invention for a combined shovel and clearing tool arrangement is subject to a wide variety of embodiments. However, to ensure that one skilled in the art will fully understand and, in appropriate cases, be able to practice the present invention, certain preferred embodiments of the broader invention revealed herein are described below and shown in the accompanying drawing figures.

Figure 1:
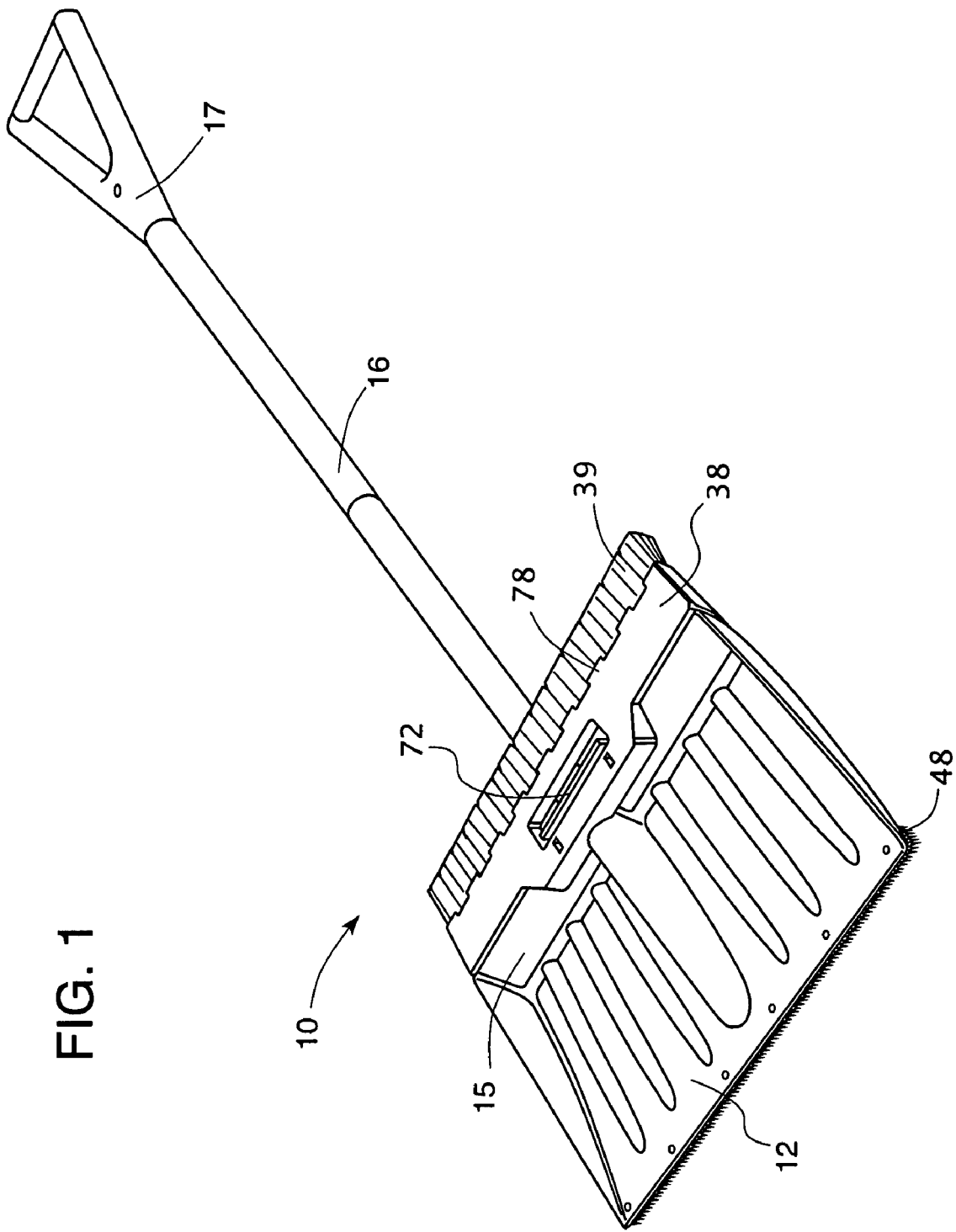
FIG. 1 is a perspective view of a combined shovel and broom arrangement pursuant to the present invention in a shovel configuration.
Figure 2:
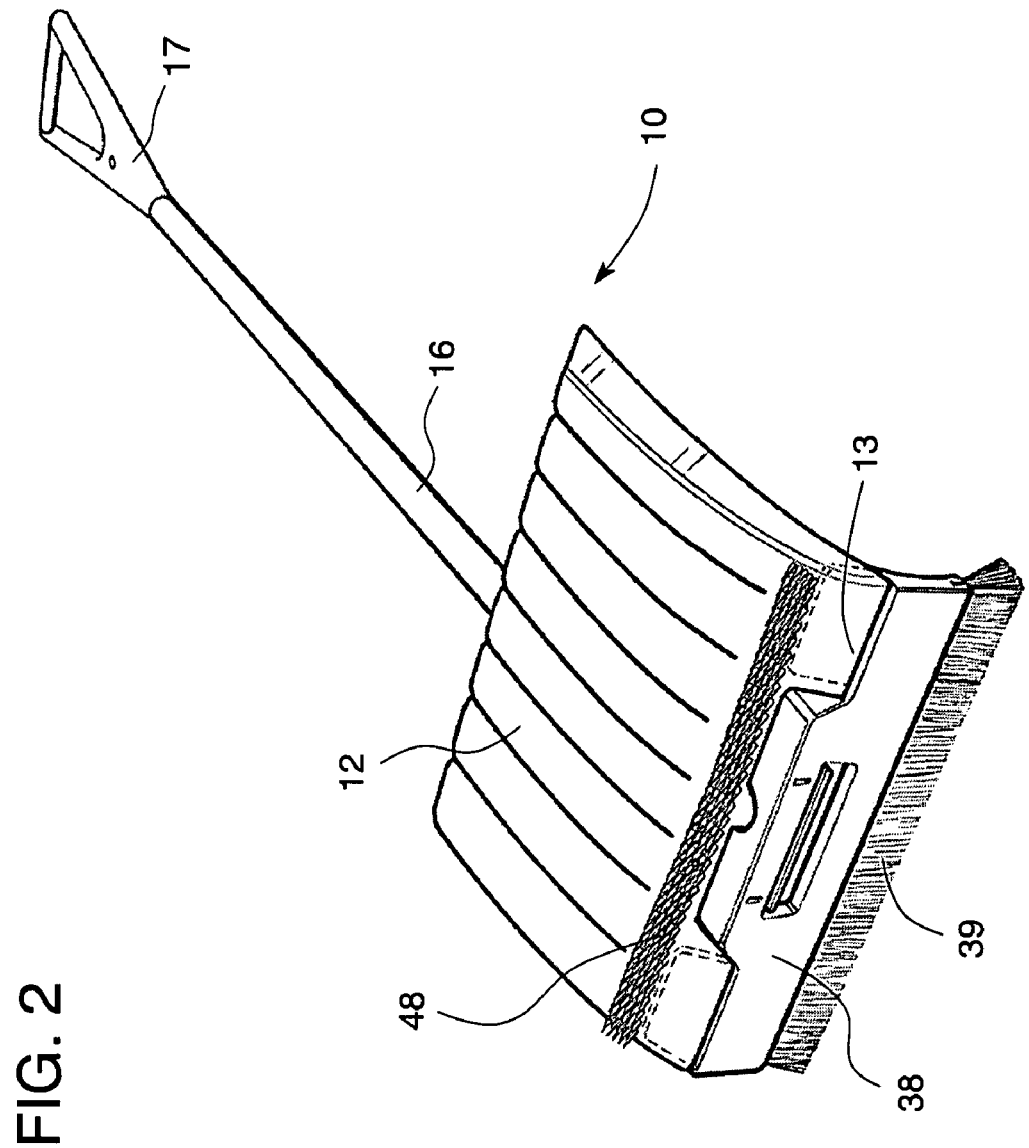
FIG. 2 is a perspective view of a combined shovel and broom arrangement according to the present invention in a vehicle broom configuration.

Looking more particularly to the drawings, a first exemplary embodiment of the present invention for a combined shovel and clearing tool arrangement is indicated generally at 10 in FIG. 1. There, one sees that the combined snow shovel and clearing tool arrangement 10 can have a shovel blade 12 retained at a distal end of a handle 16. A grip member 17 can be fixed to a proximal end of the handle 16. The clearing tool can comprise a snow broom 38 such that the combined shovel and clearing tool arrangement 10 can alternatively be referred to as a combined shovel and broom arrangement 10. The snow broom 38 can be removably retained in a storage configuration attached to an upper edge 15 of the shovel blade 12 as shown, for example, in FIG. 1. The snow broom 38 can alternatively be coupled to a lower edge 13 of the shovel blade 12 in a use configuration as shown, for example, in FIG. 2.

Figure 3A:
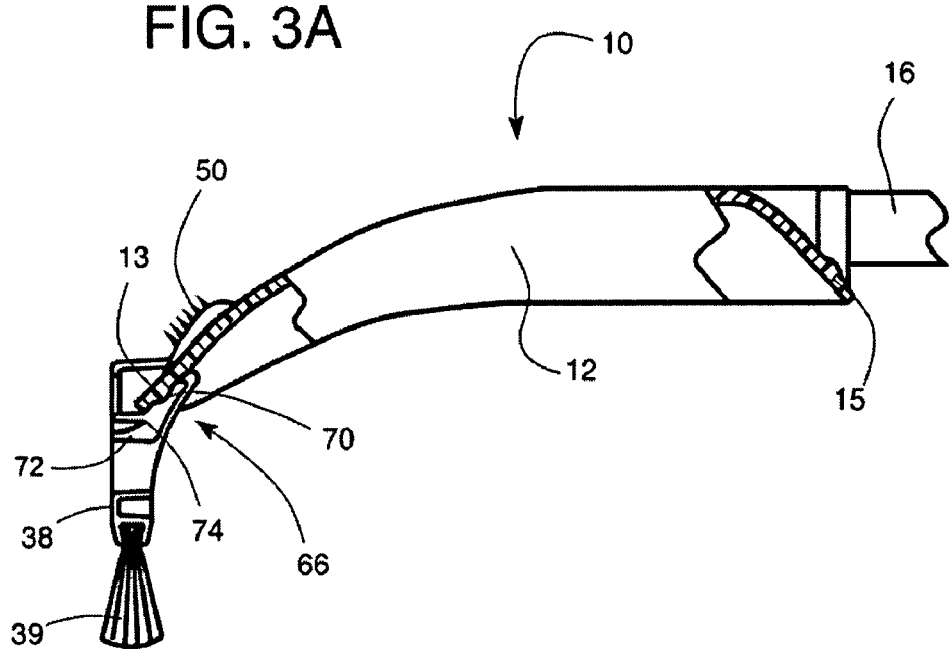
FIG. 3A is a sectioned view in side elevation of a shovel portion of a combined shovel and broom arrangement under the present invention.
Figure 3B:
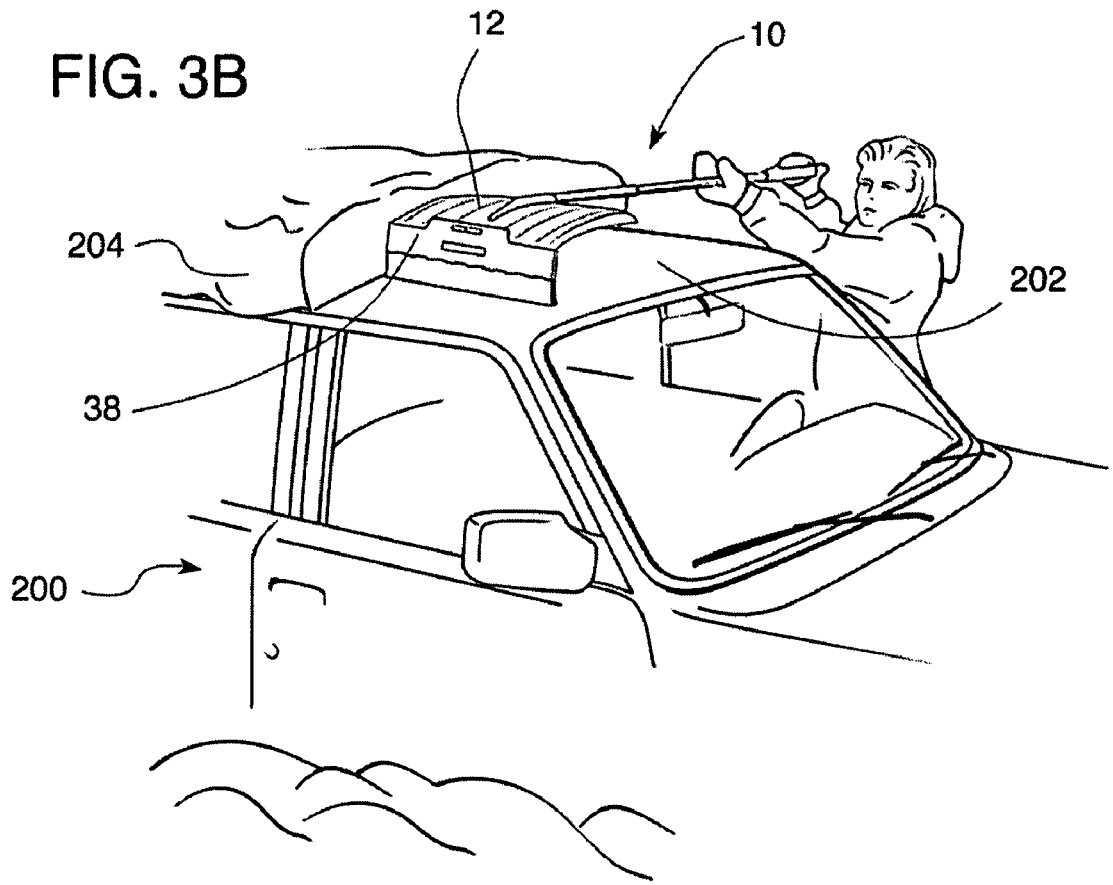
FIG. 3B is a perspective view of an embodiment of the combined shovel and broom arrangement being employed to clear snow from a vehicle.

With the snow broom 38 in a use configuration, the combined snow shovel and broom arrangement 10 can be turned 180 degrees along the axis of the handle 16 so that the assembled combined snow shovel and broom arrangement 10 can be used to remove snow from a surface 202 of a vehicle 200 as in FIG. 3B. The design takes ergonomic advantage of the grip member 17 of the combined snow shovel and broom arrangement 10 for optimal length compared to most snow brooms. Furthermore, the grip member 17 can comprise a D-shaped construction for enabling a most convenient manipulation of the combined snow shovel and broom arrangement 10.

Figure 4:
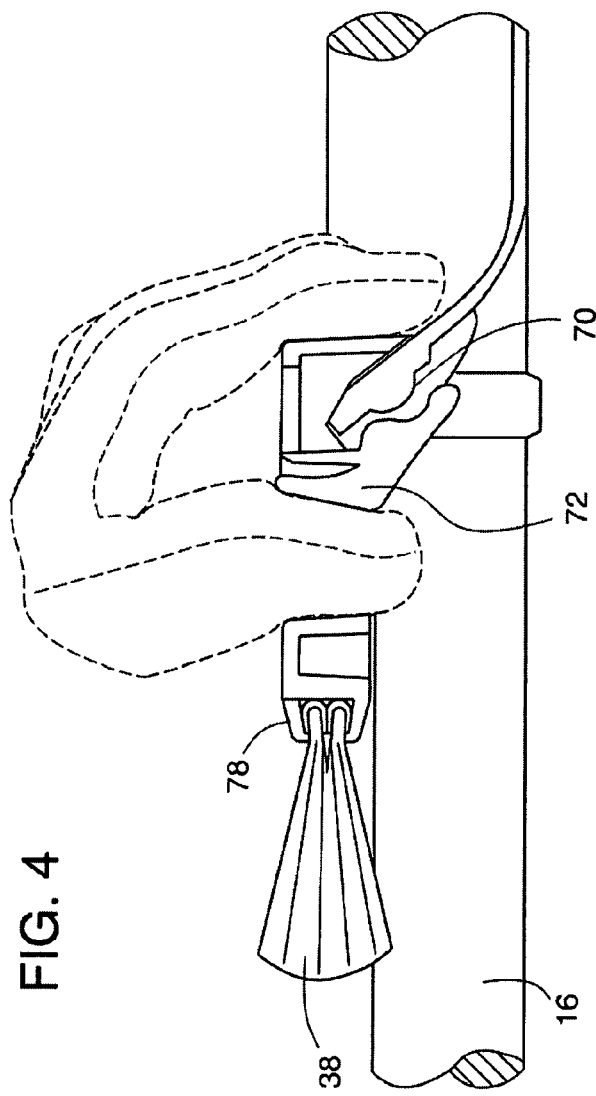
FIG. 4 is a sectioned view in side elevation of a latch arrangement pursuant to the present invention.

This document discloses several arrangements that can be used to attach the snow broom 38 to the shovel blade 12. The broom member 38 can be secured to the blade 12 by an integral latch 66 as shown, for example, in FIG. 3A. The latch 66 can be released from a receiver protuberance 70 on each of the lower and upper edges 13 and 15 by simply squeezing the integral thumb bar 72 as shown in FIG. 4. A further advantage of this non-tethered design allows handheld use of the broom member 38 alone, such as to clear door locks, mirrors, and the like. The combined snow shovel and broom arrangement 10 can be manufactured using materials and processes known to the industry. The broom member 38 can be made of plastic or other lightweight materials.

Broom bristles 39 can also be made of plastic with "flagged" or exploded tips to provide a soft contact area with a vehicle 200. Alternatively, the bristles 39 could be formed from other pliable materials such as foam rubber, squeegee strips, or sheepskin like materials. However, plastic bristles 39 could be considered preferred in that they are unlikely to drag debris across a surface under pressure causing scratches on the surface. Instead, debris is free to be swept up into the bristles 39 and off of the surface.

Figure 5:
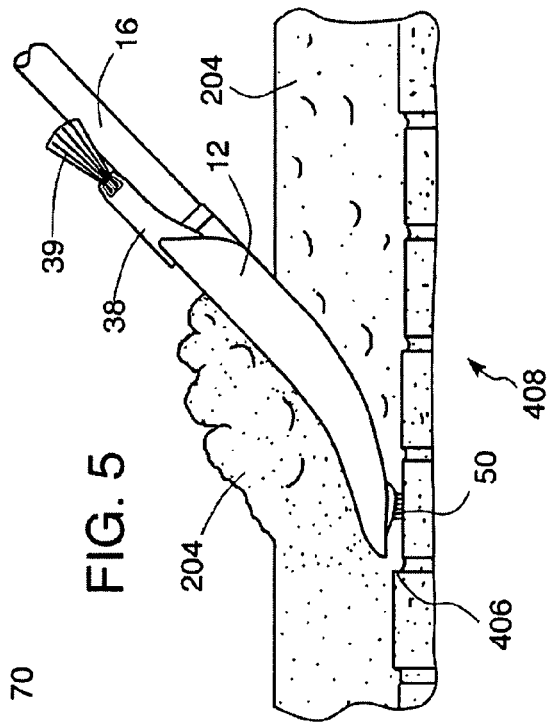
FIG. 5 is a view in side elevation of a shovel portion of a combined shovel and broom arrangement under the present invention being employed to remove snow from an irregular surface.

When configured for use as a snow shovel, the combined snow shovel and broom arrangement 10 greatly facilitates shoveling ground surfaces 408 with problematic surfaces portions 406 as in FIG. 5 by incorporating a bristle strip 48 of short, resilient bristles 50 located along the underside of the leading lower edge 13 of the shovel blade 12 where the blade 12 contacts the ground surface 408. This in effect sweeps snow 204 from the path instead of scraping it, thereby minimizing friction, blade wear, and user effort. The bristle strip 48 effectively supports the blade 12 a short distance above the surface 408 being cleared. It allows the shovel blade 12 to glide easily over problematic surface portions 406, such as bumps, cracks, and irregularities, while scooping the majority of the snow 204 into the blade 12. The thin layer of snow 204 not scooped up by the blade 12 is simply swept along by the bristles 50. The bristles 50 could be integrally molded with the shovel blade 12 or fixed thereto as a separate member.

Figure 4A:
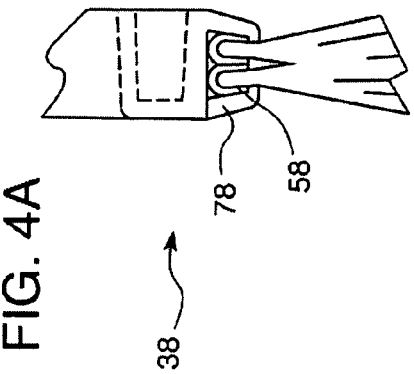
FIG. 4A is a sectioned view in side elevation of bristle spine mounting arrangement as disclosed herein.

FIG. 4A shows a construction for retaining first and second bristles spines 58 in less space than conventional snow brooms. The design also allows outer jaws or supports 78 of greater length than in prior art injection-molded constructions since the injection-molding tool does not have to form a central dividing support as is included in conventional brooms. This provides a stronger support for the spines 58 and minimizes the cross-sectional thickness of the broom 38.

The disclosed combined snow shovel and broom arrangement 10 can employ conventional type shovel handles 16 made from wood, metal, fiberglass, or plastic tubing. The tubing may be seam-welded steel, extruded plastic, or aluminum. The snow broom 38 can be made from conventional materials and processes known to that industry such as injection molding, extrusions, and the like. The bristles 48 can be of plastic, such as polypropylene. Flagged or exploded tip bristles can be incorporated to prevent scratching vehicle surfaces. The grip member 17 can be a conventional D-grip made of injection molded plastic. Rubberized grips can be added to both the grip member 17 and the elongated handle 16 for comfort and to protect the finish of the vehicle 200. Shovel blades 12 can be made from any suitable material including cold-formed metal, injection-molded plastic, polypropylene, or polycarbonate.

Figure 6:
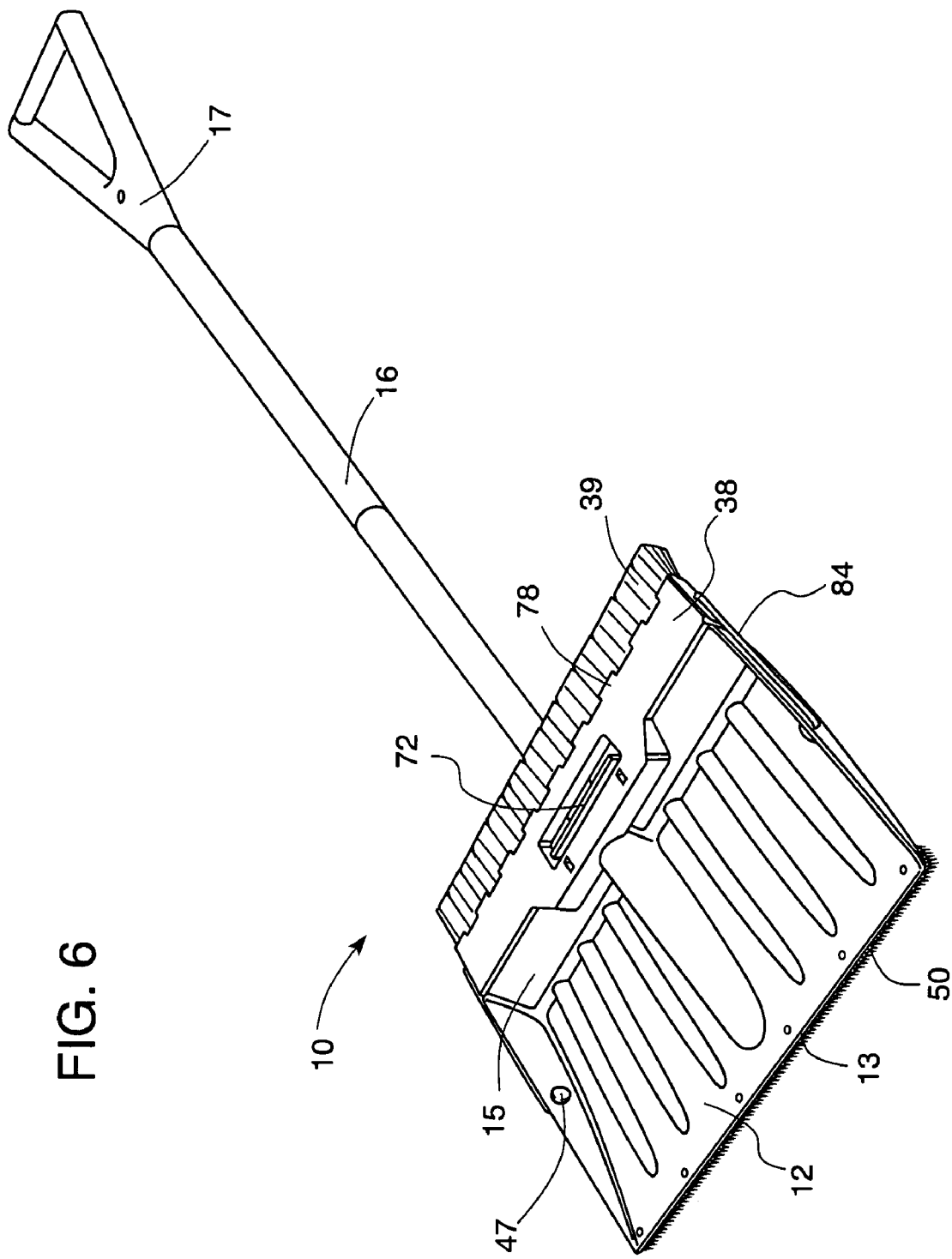
FIG. 6 is a perspective view of an alternative embodiment of the combined shovel and broom arrangement.
Figure 6C:
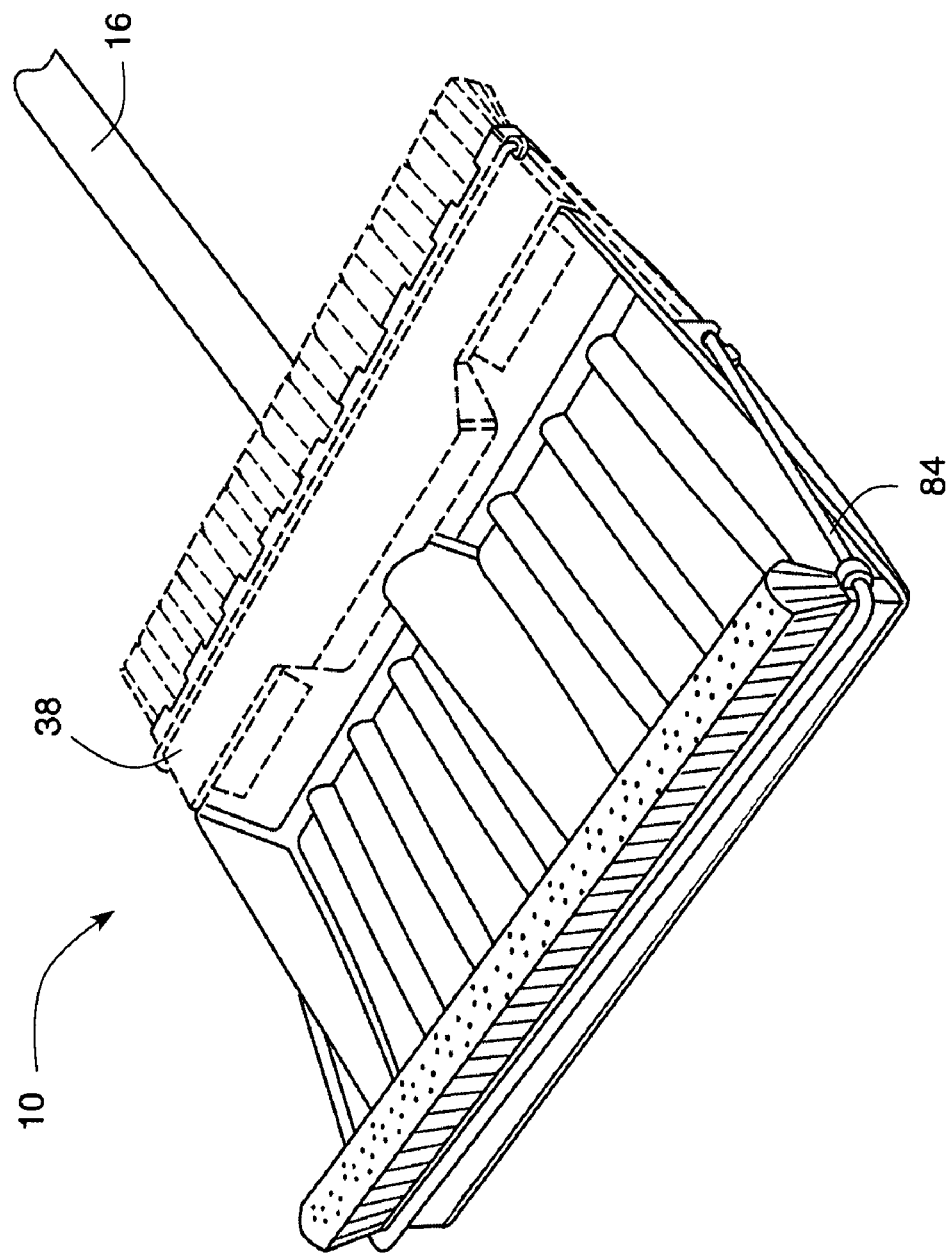
FIG. 6C is a perspective view of a combined shovel and broom arrangement in a broom configuration.
Figure 6D:
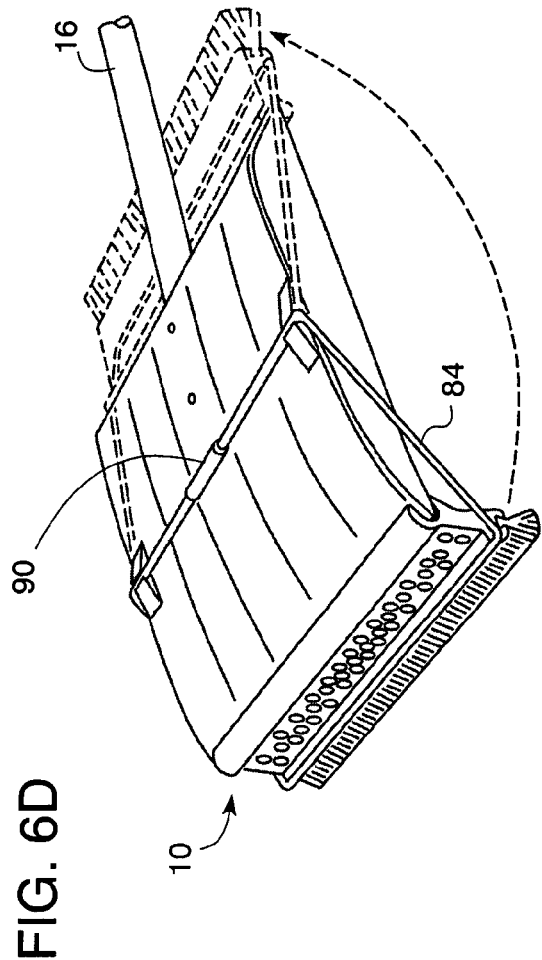
FIG. 6D is a perspective view of a further combined shovel and broom arrangement in a broom configuration.
Figure 6E:
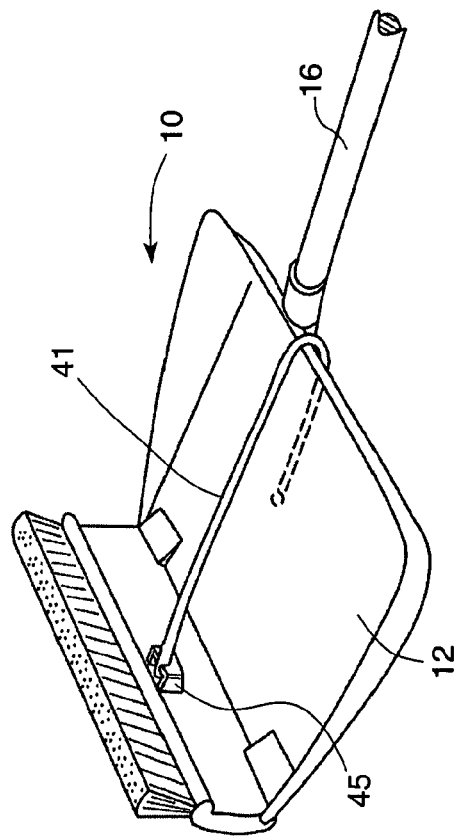
FIG. 6E is a perspective view of another combined shovel and broom arrangement in a broom configuration.

FIG. 6 shows a separable snow broom 38 attached to a shovel blade 12 in a first storage position. In its functional position as a vehicle sweeper, the broom 38 is attached to the forward edge 13 of the shovel blade 12. This arrangement requires a quick-releasable attachment means for securing the broom 38 in either position. FIG. 6 depicts the use of elastic tethers 84 attached to either or both lateral ends of the broom 38 and to the shovel blade 12. Alternatively, as FIGS. 6E and 6F show, a single elastic tether 41 is also possible. The elastic tether 41 or elastic tethers 84 may be constructed in any appropriate manner including from rubber, metal springs, or a combination of the two. In either case, the tether 41 or tethers 84 can bias the broom member 38 into a nested mount in both positions.

Figure 7:
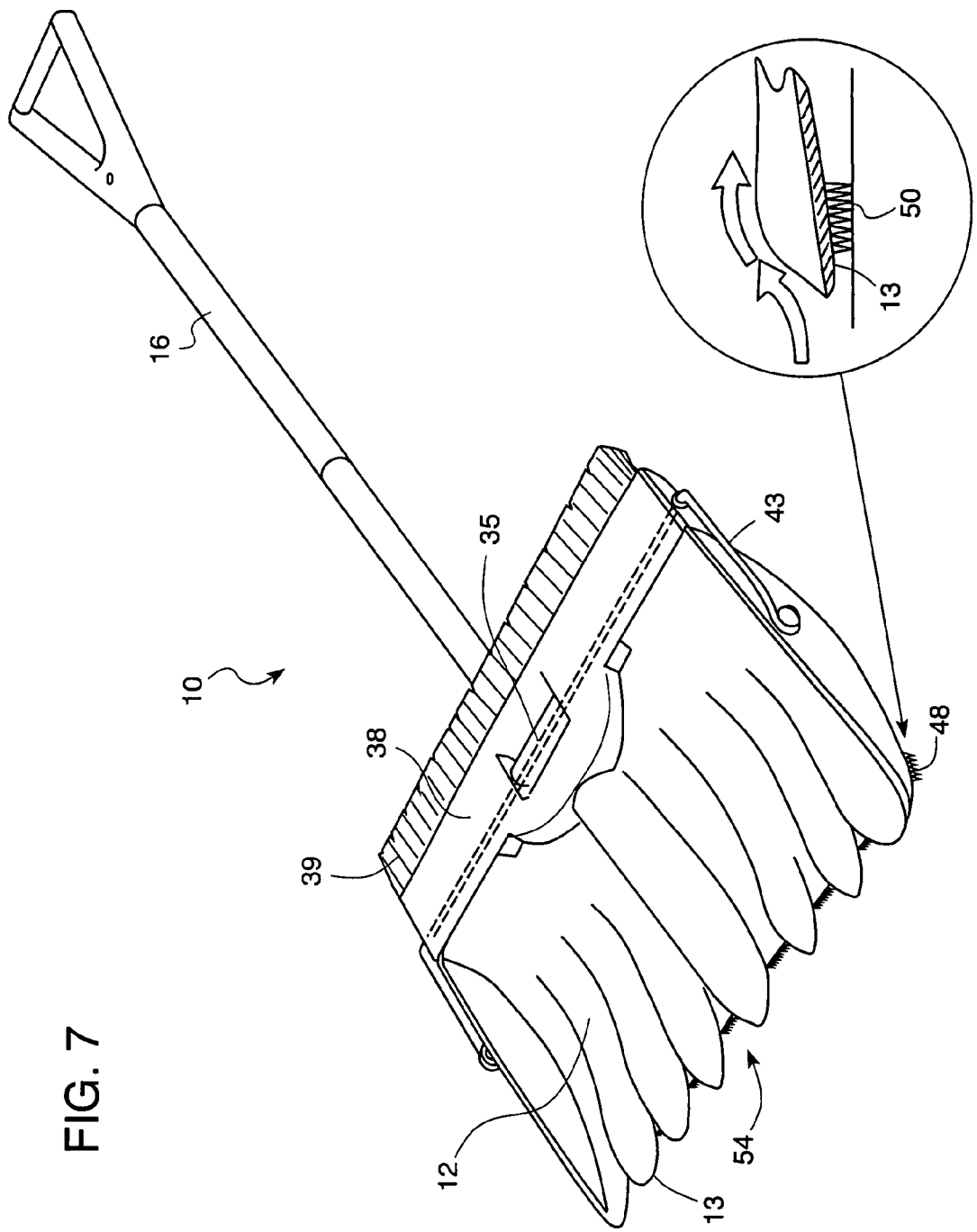
FIG. 7 is a perspective view of still another combined shovel and broom arrangement pursuant to the instant invention.
Figure 8B:
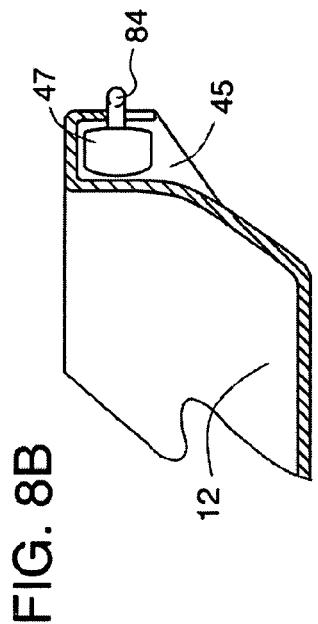
FIGS. 8B, 8C, and 8E are cross sectional views of the elastic cord attachment arrangement of FIG. 8A.
Figure 8D:
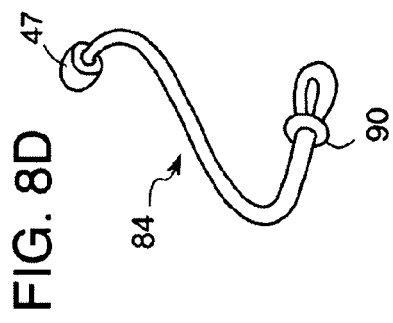
FIG. 8D is a perspective view of an elastic cord for use in the attachment arrangement of FIGS. 8A through 8C.
Figure 8A:
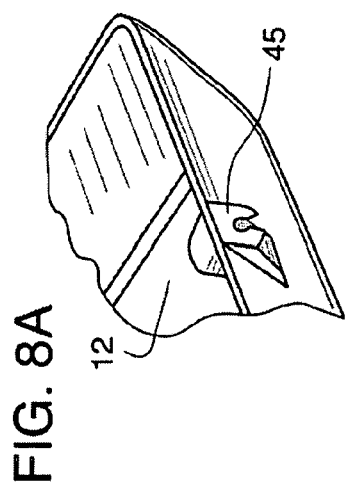
FIG. 8A is a perspective view of an elastic cord attachment arrangement of a combined shovel and broom arrangement as disclosed herein.
Figure 8C:
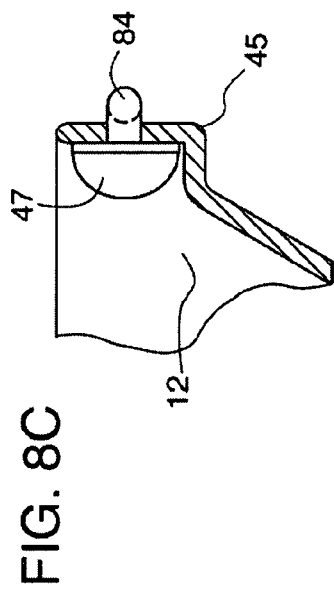
Figure 8E:
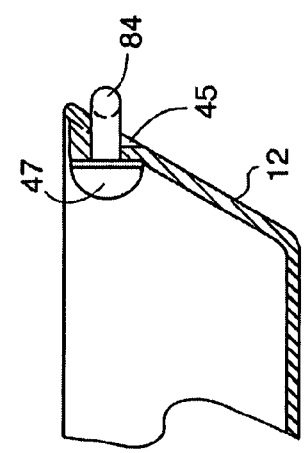

Alternatively, as in FIG. 7, one or more substantially rigid arms 43 can be pivotally attached to the midpoint of the blade 12 and to one or both ends of the broom member 38. Under this construction, the broom member 38 can include a clasp 35 that can be integrally molded therewith to enable a frictional engagement of the blade 12. It is also possible to attach the broom member 38 with one or more thumbscrews or cam levers (not shown). Among other obvious alternatives are hook and loop fasteners, garment type snaps, and spring clips.

FIGS. 8A through 8E show a bungee or elastic cord 84 and a receiver portion 45, which can be injection-molded, to capture an end of the elastic cord 84 and to minimize contact with snow within the shovel blade. The elastic cord 84 can have integrally molded terminal heads 47 at one or both ends. The heads 47 can be captured by receiver portions 45 in the shovel blade 12 as well as the broom member 38. Alternatively, as in FIG. 9, a simple crimp sleeve 90 could suffice to create a head at either end of the elastic cord 84. The heads 47 can be quickly releasable to allow un-tethered use of the broom member 38.

Figure 11:
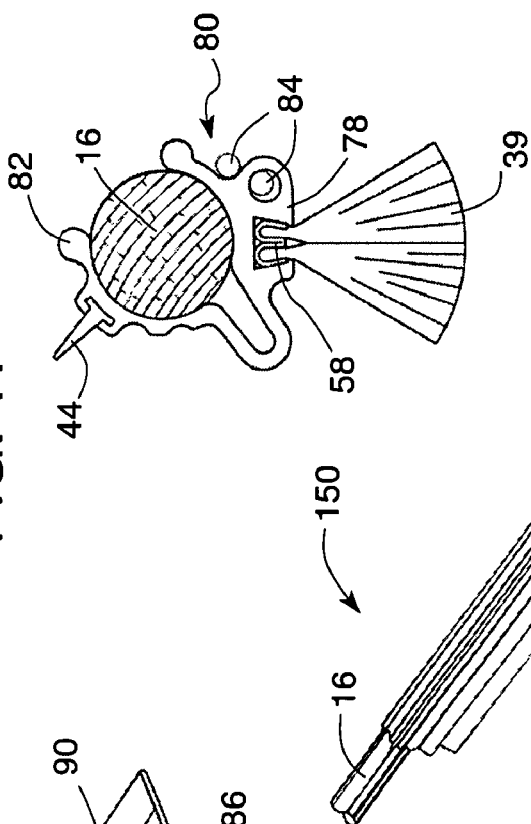
FIG. 11 is a cross sectional view of the broom member in a storage configuration as in FIG. 10.
Figure 10:
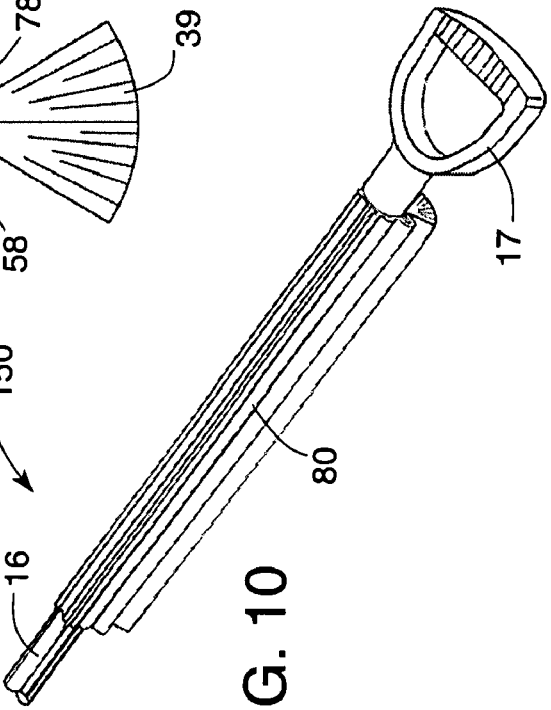
FIG. 10 is a perspective view of a handle portion of a combined shovel and broom arrangement depicting a broom member in a storage configuration.
Figure 9:
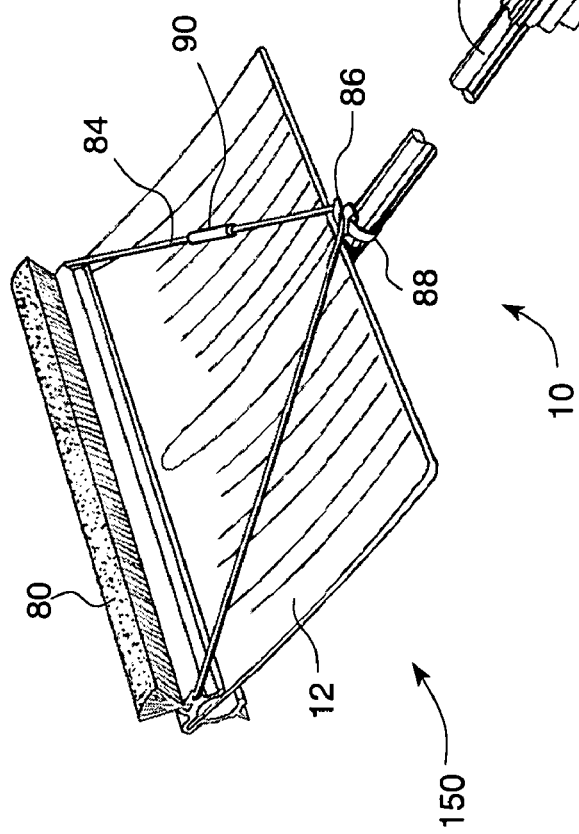
FIG. 9 is a perspective view of a shovel portion of a combined shovel and broom arrangement showing still another elastic cord attachment arrangement pursuant to the instant invention.

Bearing in mind the many snow shovel designs of the prior art, the present invention further contemplates what can be termed a universal broom member 80 that can be universally attachable to a shovel blade 12 of a variety of commercially available snow shovels 150 as shown, for example, in FIGS. 9 through 11. The universal broom member 80 incorporates a means for quickly attaching to commercially available snow shovels 150. The universal broom member 80 can be attached to the forward edge 13 of the shovel blade 12 for clearing snow from a vehicle 200. When not being used as a broom, the universal broom member 80 can be attached to the shovel 150 without impeding the primary goal of shoveling snow.

In an effort to accommodate as many snow shovel designs as possible, one must identify the physical characteristics that vary the least among most snow shovels 150. When considering how a universal broom member 80 can be attached to the shovel blade 12 in a storage disposition, it becomes clear that shovel blades 12 are relatively similar at their lower edge but dissimilar along the upper edge 15 of the shovel blade 12. Accordingly, a universal broom member 80 under the present invention can be designed to be stored along a cylindrical handle shaft 16 since there is relatively little variation of length and diameter among most snow shovels 150.

Figure 25:
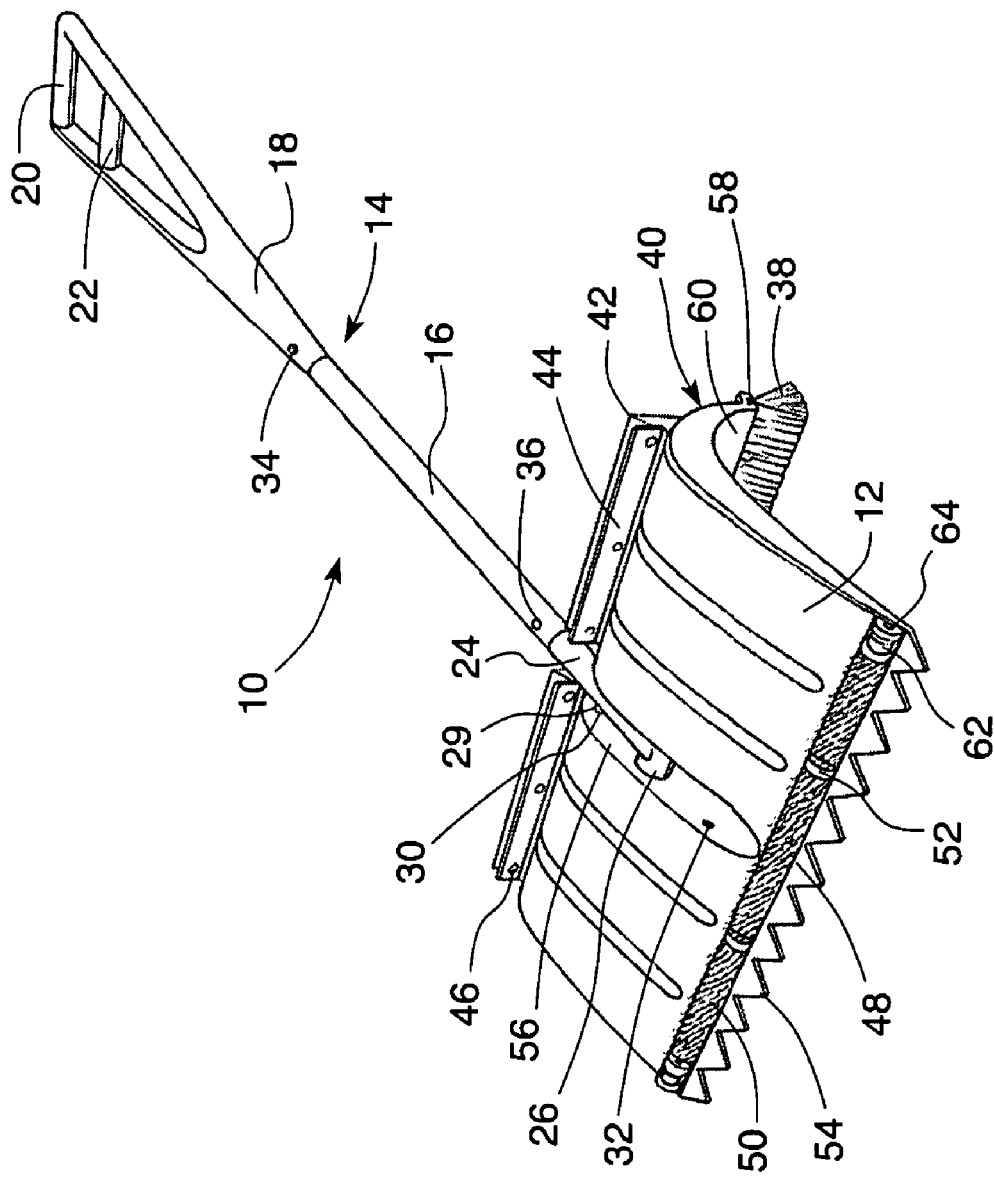
FIG. 25 is a perspective view of still another combined shovel and broom arrangement as disclosed herein.

To avoid impeding their primary purpose as a snow shovel 150, the universal broom member 80 can be attached just below the grip member 17. The universal broom member 80 can also include a squeegee 44 and, additionally or alternatively, an ice scraper 42 as is shown in FIG. 25. A retractable handle (not shown) can be added to augment handheld use. The universal broom member 80 can alternatively be attached to the shovel blade 12 with thumbscrews, cam or spring clamps, or any other effective arrangement. FIGS. 9 through 15 depict a variety of universal broom member 80 constructions.

One advantage of the universal broom member 80 is its improved cost effectiveness. The foregoing will explain how this universal design will accommodate most snow shovels 150 already in use. There would be no need to provide the snow shovel 150 itself thereby yielding a major cost savings. Additionally, the universal broom member 80 can in particular embodiments be made from a cost-effective plastic extrusion instead of injection molded plastic. This results in a dramatically less expensive upfront investment as well as rapid amortization. With such constructions, it will be possible to offer many of the advantages of the combined snow shovel and broom arrangement 10 at a fraction of the cost.

Figure 14:
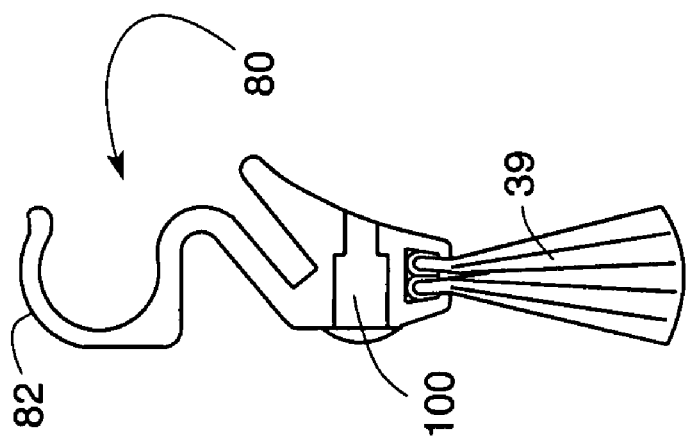
FIG. 14 is a cross sectional view in side elevation of a universal broom portion with a sliding spring clamp as disclosed herein.

FIG. 10 depicts a shovel 150 with a broom member 80 attached to its handle 16. The universal broom member 80 includes a handle clip 82. FIGS. 11 and 14 show this clip in profile. The universal broom member 80 in FIG. 10 is rotatable with respect to the handle 16 and can be positioned by the user to accommodate flat nesting with other shovels 150 or perpendicular to the shovel blade 12 as is shown in FIG. 10 for more secure orientation during shoveling.

FIGS. 9, 11, 12, and 13 show an elastic cord 84 that provides tension between the universal broom member 80 and a hook collar 86 installed at the base of the handle 16. The hook collar 86 can be attached laterally to the handle 16 by the user and secured either with a screw (not shown) to clamp it about the handle 16, a zip tie 88 or clipped on by spring memory provided by the hook collar 86. When not being used, the elastic cord 84 can reside along the inside surface of the universal broom member 80 as depicted in FIG. 11. The elastic cord 84 can be attached to the universal broom member 80 at one or more locations by any number of cord termination members captured within integral receivers 100 as shown in FIG. 14. Alternatively, the elastic cord 84 can be routed through the universal broom member 80 lengthwise as in FIG. 9 and be attached to itself with a crimp sleeve 90.

Figure 15:
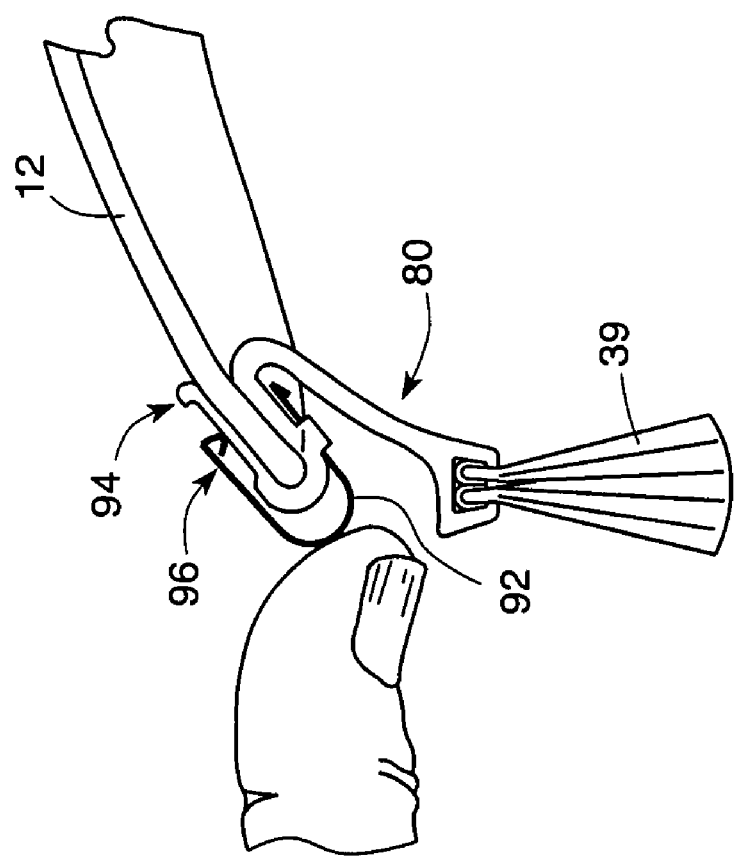
FIG. 15 is a cross sectional view in side elevation another universal broom portion.

In FIGS. 14 and 15, the universal broom member 80 has alternative profiles. Additionally, in FIG. 11, the universal broom member 80 incorporates a squeegee blade 44. These and further profiles can be formed in any suitable manner including by being extruded from plastic or metal. In FIG. 15, an alternative arrangement for clamping the universal broom member 80 to the shovel blade 12 using a U-shaped spring clip 92 that is reciprocatably attached to the universal broom member 80 such that the user can slide the spring clip 92 between a clamping location 94 and a release location 96.

Figure 16:
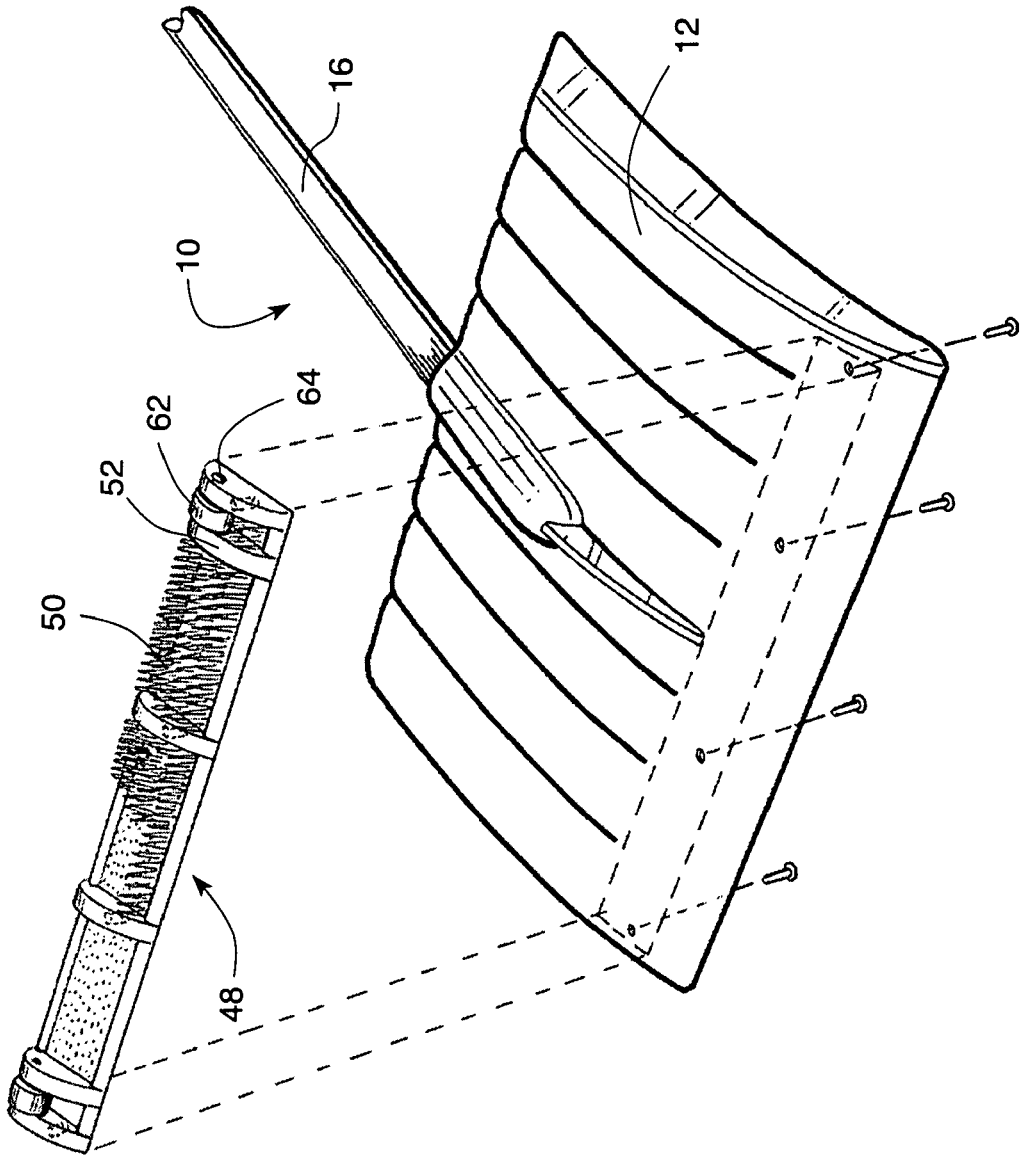
FIG. 16 is a perspective view of an obverse side of a shovel portion and bristle portion as disclosed herein.
Figure 18:
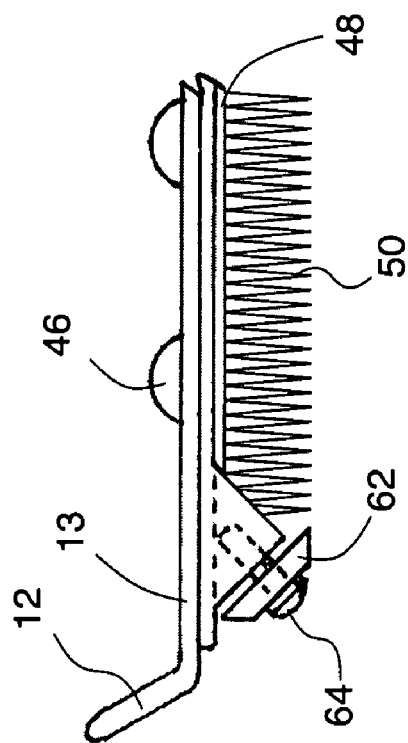
FIG. 18 is a view in front elevation of another wheeled bristle portion pursuant to the present invention.
Figure 17:
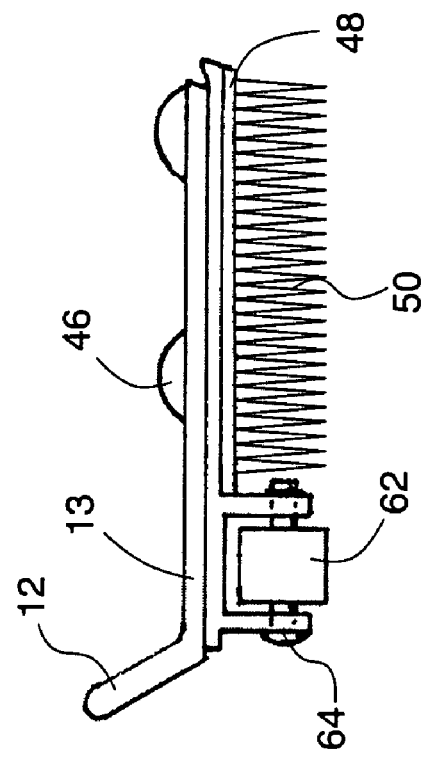
FIG. 17 is a view in front elevation of a wheeled bristle portion pursuant to the present invention.
Figure 20:
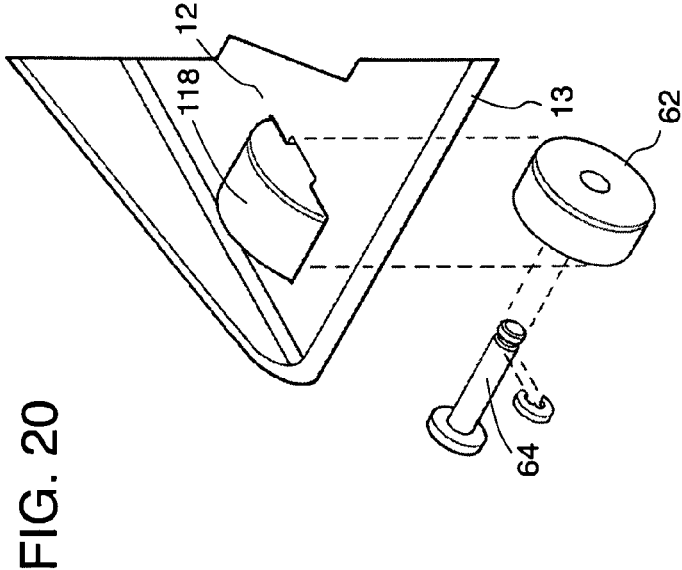
FIG. 20 is a perspective view of the wheeled portion of FIG. 19 in a disassembled configuration.
Figure 19:
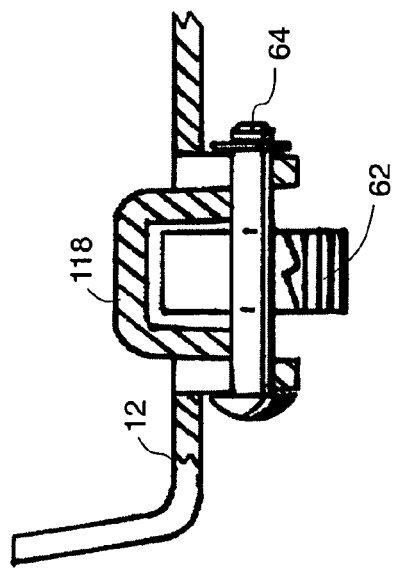
FIG. 19 is a cross sectional view of a wheeled portion of a shovel blade.
Figure 21:
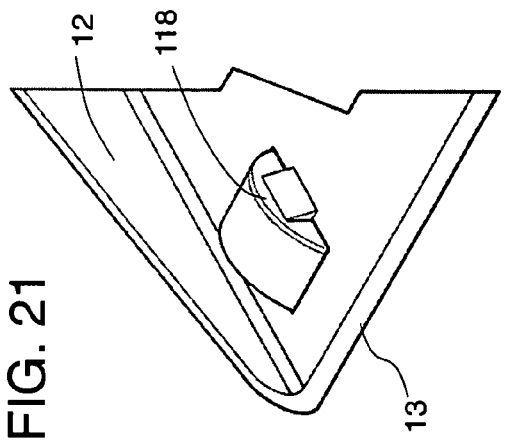
FIG. 21 is a further perspective view of the wheeled portion of FIG. 19.
Figure 22:
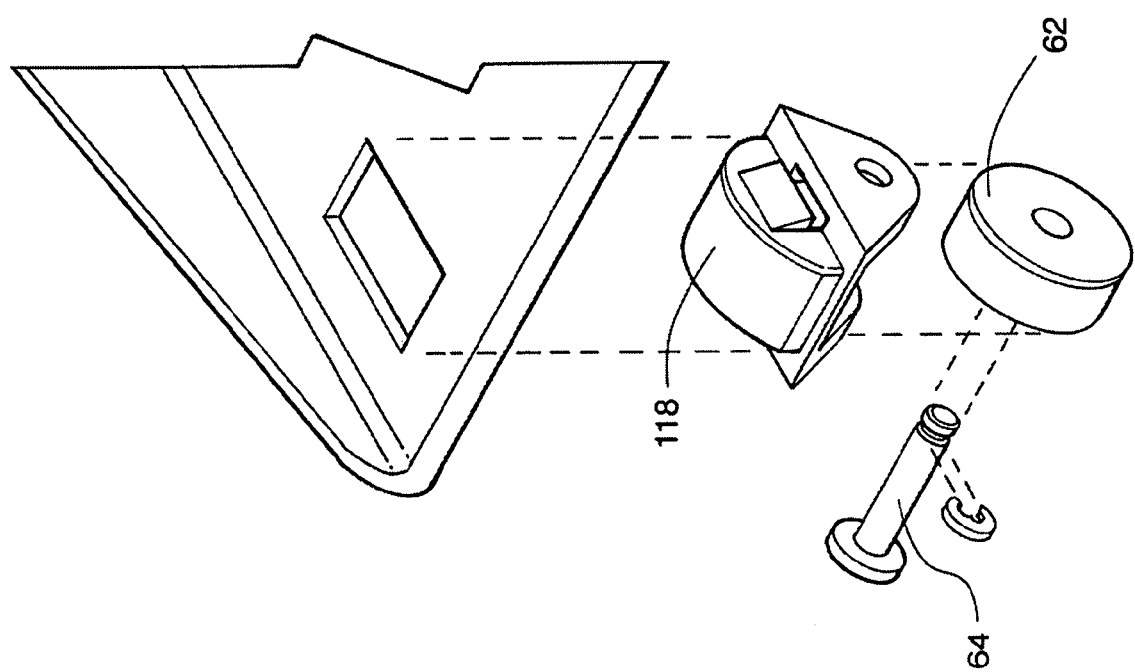
FIG. 22 is a perspective view of a modular wheeled portion of a shovel blade in a disassembled configuration.

FIGS. 16, 17, and 18 show a bristled strip 48 that can be attached by the manufacturer or the consumer to existing shovel blades 12 in much the same way that metal wear strips are commonly attached. The bristle strip 48 can be replaced by the user when worn. Other embodiments combining bristles 50 with wheels or rollers 62 and/or skids 52 are contemplated and should also be considered to be within the scope of the invention. Such devices may prove useful so that the weight of accumulating dirt, snow, or other materials on the shovel blade 12 does not flatten the bristles 50 under pressure.

Figure 23:
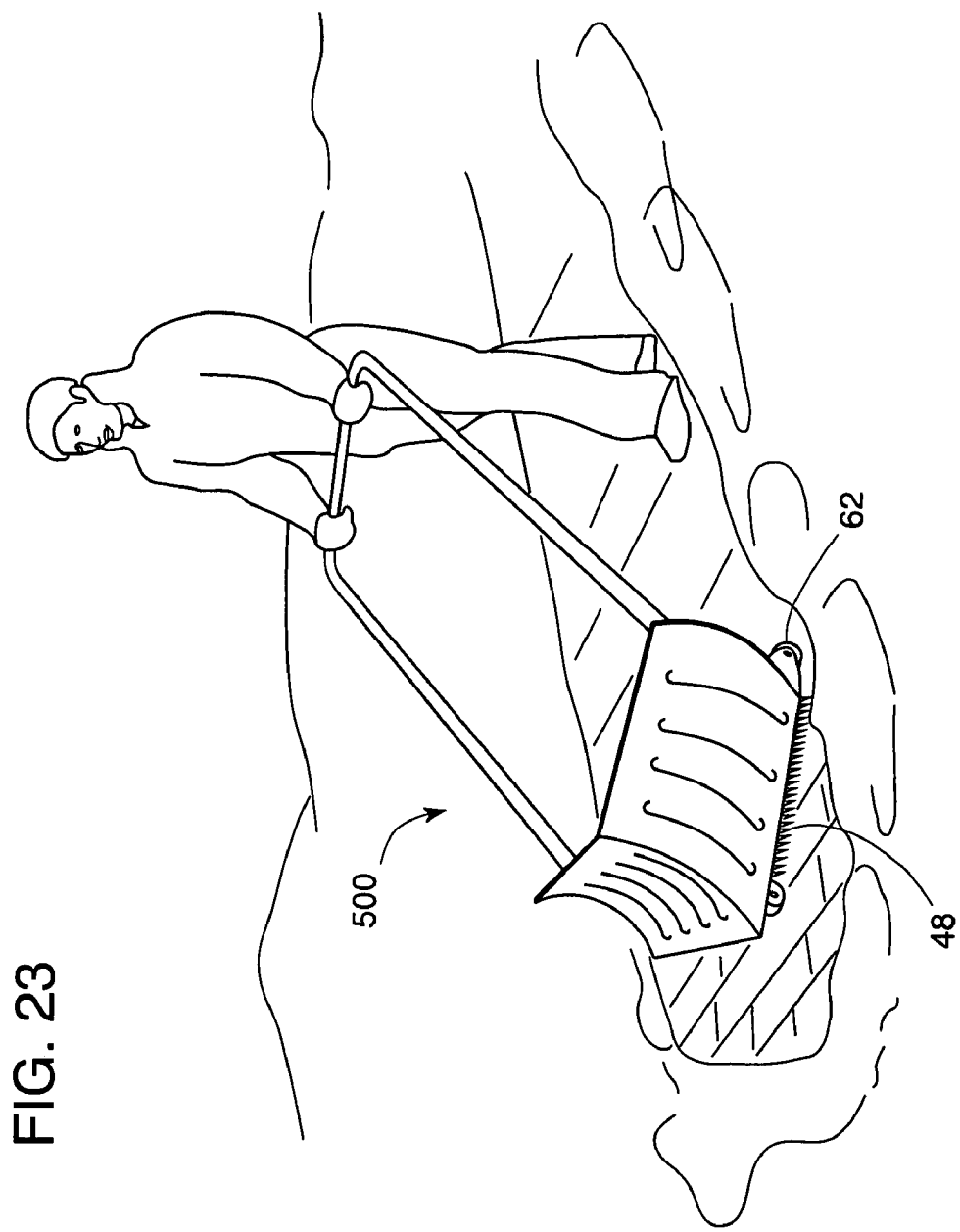
FIG. 23 is a perspective view of another shovel arrangement pursuant to the invention disclosed herein being employed for clearing snow from a ground surface.

Wheels 62 can be located in close proximity to the bristles 50 or the bristle strip 48 with wheel supports 52 that are molded integrally with the shovel blade 12 or with plug-in wheel and fender assembles 118 as in FIGS. 19 through 22. The inventor anticipates the application of these ideas to other devices including push brooms, pusher type shovels, and plow-type devices 500 as in FIG. 23, which can be manually operated or powered. The bristles 50 can be crafted from any suitable material.

Figure 24:
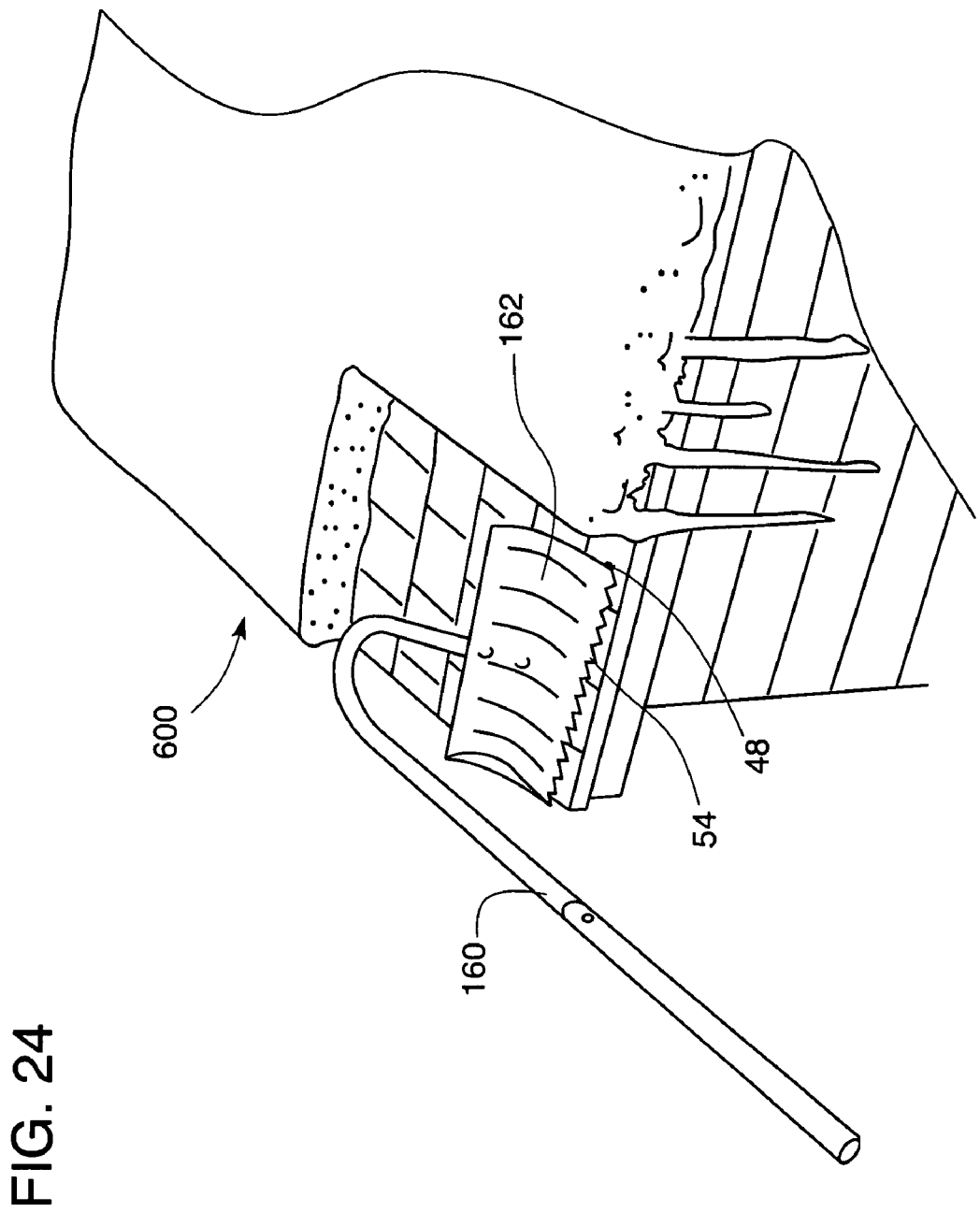
FIG. 24 is a perspective view of another broom arrangement pursuant to the invention disclosed herein being employed for clearing snow from a roof surface.

In FIG. 24, one sees a bristle strip 48 combined with a snow roof rake 160. The bristle strip 48 would prevent damage to roof shingles while providing a lightweight alternative to wheeled designs. Of course, as in previous embodiments, wheels and skid cams (not shown in FIG. 24) can also be used to provide the contact between the rake blade 162 and the roof 600. Further means to facilitate forward motion of a shovel blade 12 or the rake blade 162 along a surface include a serrated leading edge 54. The zigzag shape would tend to break up hard packed snow. The points of the zigzag pattern may be reinforced with molded ribs for added strength. Alternatively, the points may be reinforced with a metallic forward edge.

Figure 26:
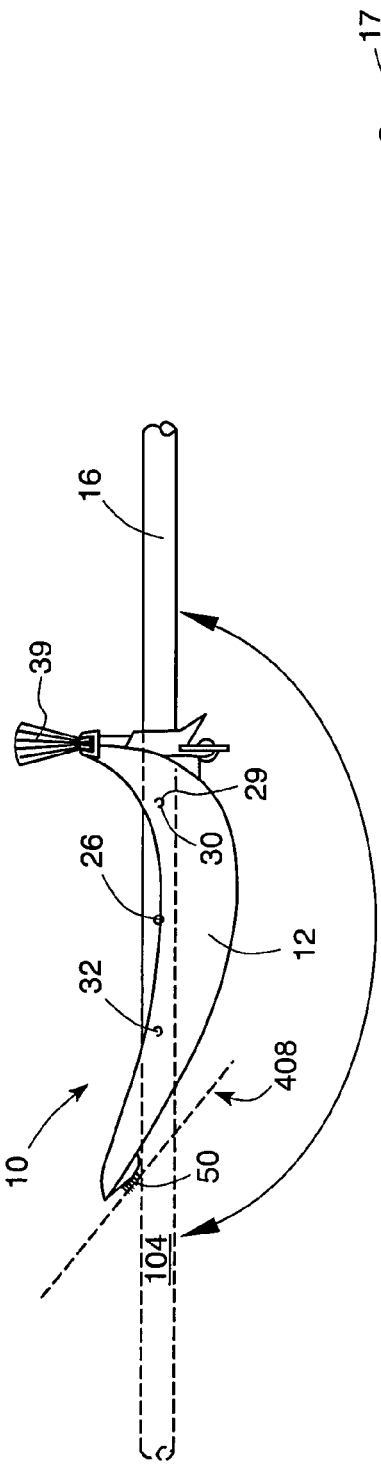
FIG. 26 is a view in side elevation of a further combined shovel and broom; arrangement pursuant to the instant invention.
Figure 27:
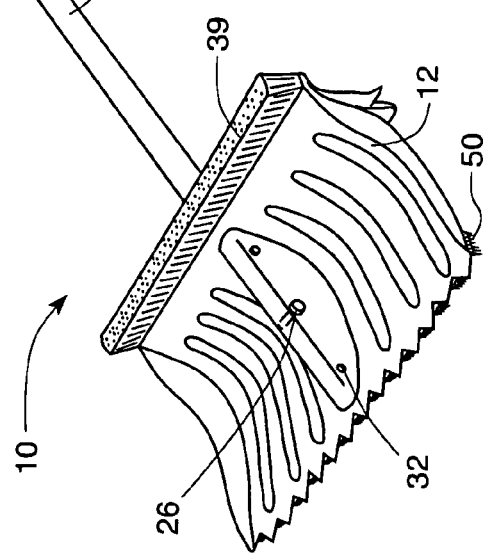
FIG. 27 is a perspective view of another combined shovel and broom arrangement.
Figure 29:
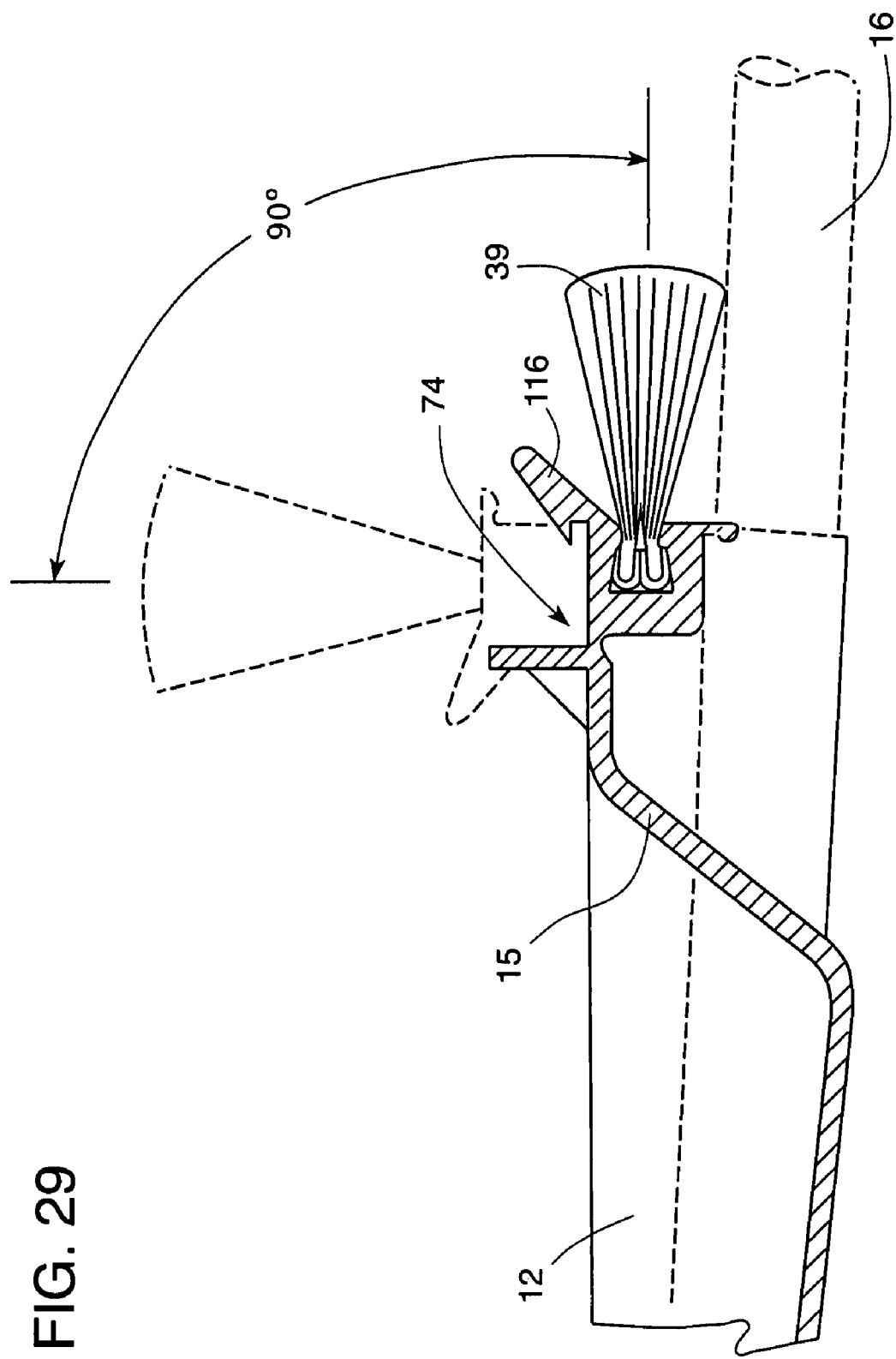
FIG. 29 is a cross sectional view in side elevation of a combined shovel and broom arrangement with pivoting handle and broom portions.

An alternative construction for reconfiguring a combined snow shovel and broom arrangement 10 from a snow shovel configuration to a configuration for vehicle sweeping is shown in FIGS. 25 through 29. The combined snow shovel and broom arrangement 10 employs a straight handle 16 that is pivotally attached in relation to a central trough 56 on the obverse side of the shovel blade 12. In FIGS. 25 and 26, the pivotable coupling allows the shovel blade 12 to pivot and lock into either position by way of a spring-biased pin 28. As FIG. 29 shows, the broom member 38 can fold flat via a hinge 74, which can comprise a plastic living hinge to facilitate nested storage with other combined snow shovel and broom arrangements 10. FIGS. 28A and 28B show an alternative locking means comprising integrally injection molded under-cut memory biased detents 102 to either side of the trough 56. The detents 102 can snap around the handle 16 capturing the handle 16 just beyond its diameter. The handle 16 can be released by a pressing of the shovel blade 12 and the handle 16 out of engagement with one another.

FIG. 25 depicts a further embodiment of the combined snow shovel and broom arrangement 10 that includes a shovel blade 12 and a handle arrangement 14. The handle arrangement 14 incorporates a yoke 18, a handle 16, and a shank 24. The shank 24 is pivotal with respect to the trough 56 about the axis of a handle pivot 26. The handle arrangement 14 and the shank 24 are pivotal through approximately 180 degrees of rotation from a shoveling configuration to a sweeping configuration 104. The shank 24 and handle arrangement 14 can be secured in either position by means of any effective means, such as a dual spring pin 29 engaged with pin receivers 30 or 32.

Alternatively, shoveling and sweeping can be accomplished with the handle arrangement 14 in the shoveling position as shown, for example, in FIG. 25. In this position, a pusher surface 60 and vehicle snow broom 38 can be used to push snow from a motor vehicle rooftop or similar vehicular surfaces (not shown). Of course, shoveling would require the combined snow shovel and broom arrangement 10 to be flipped 180 degrees relative to the handle shaft axis so that the shovel blade 12 engages the ground in a conventional orientation. With the handle arrangement 14 in the second sweeping location 104, snow can be swept and pushed from vehicle surfaces by a pusher surface 40 and snow broom 38. In that position, an ice scraper 42 and a squeegee blade 44, which can be attached to the ice scraper 42 such as by rivets 46, can also be used to remove ice and moisture from vehicle windshields and windows.

With further reference to FIG. 25, the combined snow shovel and broom arrangement 10 can again incorporate a means for enabling the combined snow shovel and broom arrangement 10 to glide over bumps and uneven paved surfaces without the typical impediment to its continued forward movement. This is again accomplished by supporting the shovel blade 12 above the ground being cleared by short ground bristles 50 associated with the bristle glide strip 48. The bristles 50 allow the lower edge 13 of the shovel blade 12 to pass easily over stationary obstacles like broken pavement or uneven brick walkways, for example, that would otherwise abruptly halt the forward movement of the shovel blade 12. The bristles 50 simply sweep a thin layer of snow over bumps and uneven pavement while most of the snow is scooped onto the shovel blade 12. To further augment forward movement, a serrated edge 54 can be included to help break up hard packed snow. Again, roller wheels 62 rotatable about axles 64 or skid cams 52 can improve forward motion of the shovel blade 12 over bumps and uneven pavement. The wheels 62 and cams 52 can also prevent flattening of the bristles 50 that might occur due to excessively heavy snow or slush as it accumulates on the shovel blade 12.

Other optional features of the combined snow shovel and broom arrangement 10 involve the handle arrangement 14. An extended handle yoke 18 can provide the space needed to support one or more traversing handle grips 20 and 22. This allows users of any size to select the most comfortable grip 20 or 22 and leverage for each task. Additionally, the handle arrangement 14 can be quickly removable from the shovel blade 12 for compact storage, packaging, and store display. Quick release pins 34 and 36 can be employed to enable a disassembly of the handle yoke 18 from the handle 16 and the shovel portion 12 from the handle 16. Of course, numerous other quick release devices are contemplated and within the scope of the present invention.

Figure 30:
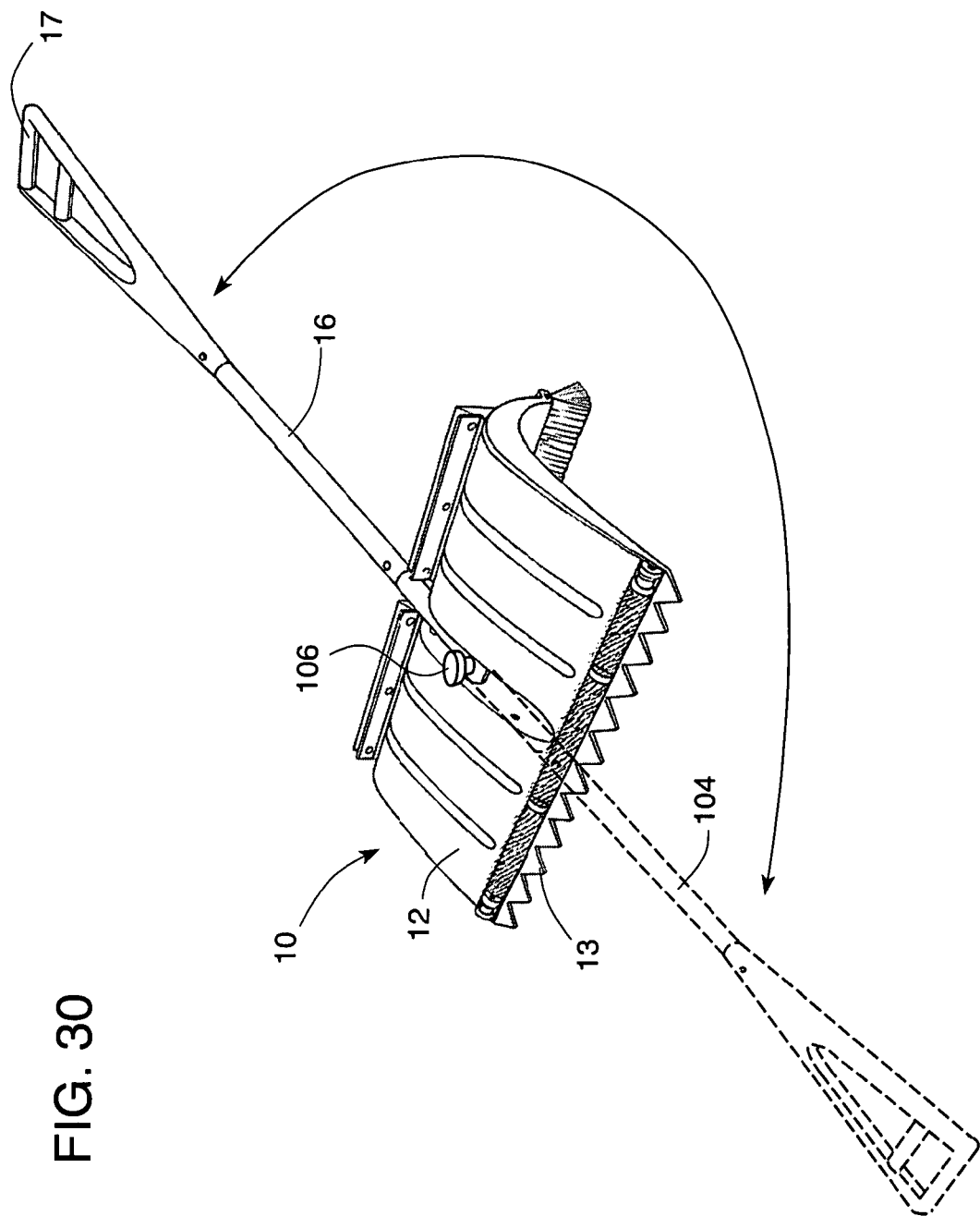
FIG. 30 is a perspective view of an alternative combined shovel and broom arrangement with a rotatable handle and pivotable broom portions.

Other ways to switch the shovel blade 12 and handle 16 orientation include various ways of pivoting the handle 16 around a single pivot point at the shovel blade 12. By way of example, FIG. 30 shows the rear view of a combined snow shovel and broom arrangement 10. There, the handle 16 is attached as before but is pivotally attached to the shovel blade 12 by use of, for example, a clamping knob 106, a cam lever (not shown), or any other effective arrangement. When the clamping knob 106 is loosened sufficiently, the handle 16 is free to lift out of the trough 56 and to pivot 180 degrees where it can be re-clamped. The handle 16 can then be used as a push handle for the broom member 38. Again, as in FIG. 29, the bristles 39 can also fold flat as shown in FIG. 29 by use of a hinge 74 to facilitate nesting several combined snow shovel and broom arrangements 10, such as in a store display or in the home.

Figure 32:
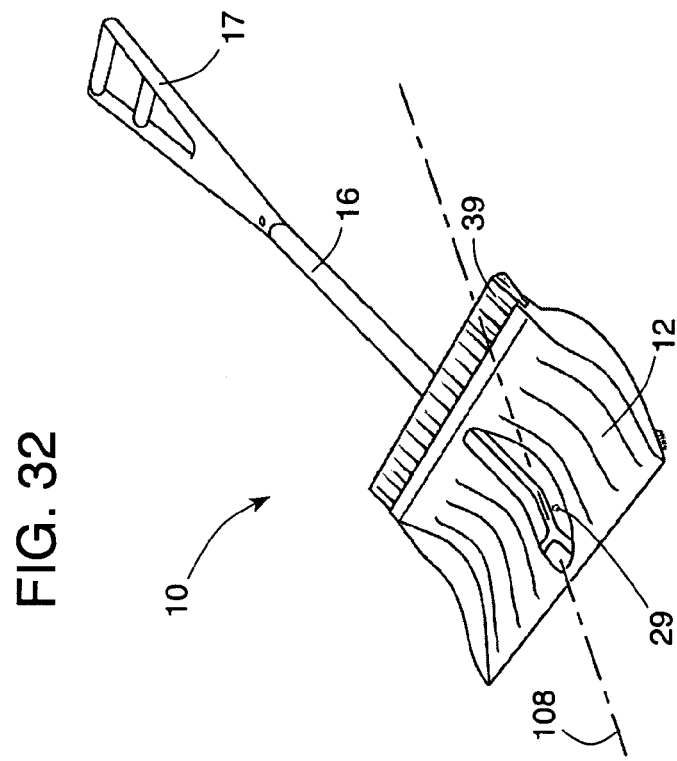
FIG. 32 is a perspective view of the combined shovel and broom arrangement of FIG. 31.
Figure 31:
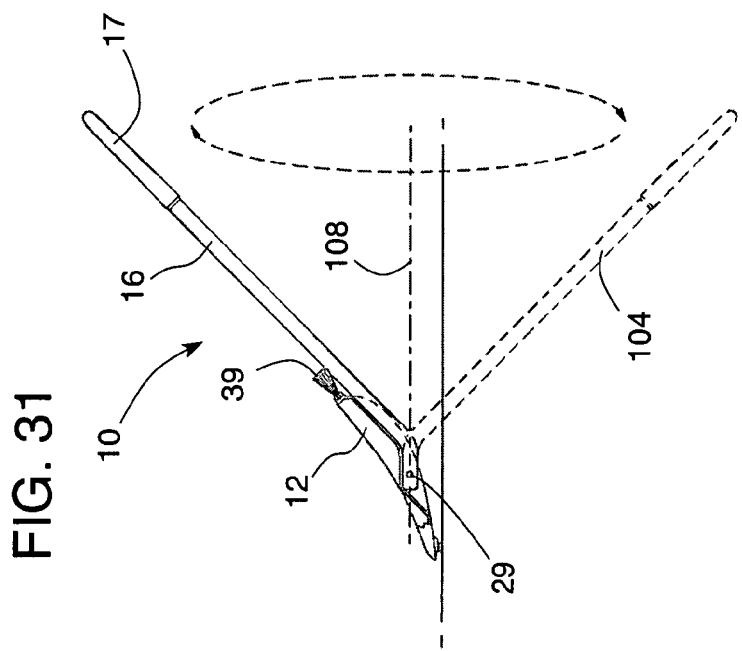
FIG. 31 is a view in side elevation of a combined shovel and broom arrangement with a swiveling handle portion.

Alternatively, it should be noted that the pivoting function of the handle 16 can be eliminated. The combined snow shovel and broom arrangement 10 can be simply rotated 180 degrees along the axis of the handle 16 for quick removal of snow from vehicle surfaces. For example, FIGS. 31 and 32 show a construction employing a handle 16 with a bend at the distal end thereof. The shovel blade 12 can be rotated about the axis 108 of the bent end of the handle 16. The shovel blade 12 can be locked into position by way of a dual spring button assembly 29, a quick release cam lever, or any other effective arrangement. A rotational indexing means can limit rotation to 180 degrees and provide a firm stop for convenience. With the handle 16 secured in this second position 104, the combined snow shovel and broom arrangement 10 can now be used to push snow from a vehicle as the bristles 39 are substantially at right angles to the handle 16.

Figure 35:
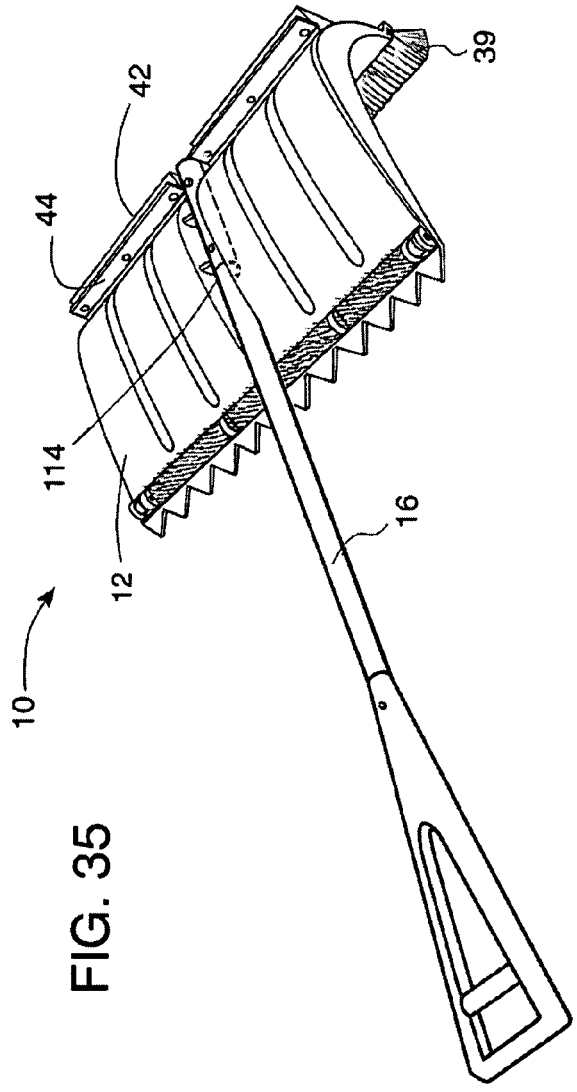
FIG. 35 is a perspective view of the combined shovel and broom arrangement of FIG. 33 in a broom configuration.

Turning next to FIGS. 33, 34, and 35, one sees that the combined snow shovel and broom arrangement 10 can incorporate a removable handle 16 that can engage alternate receivers 112 and 114. Snow can be blocked from entering the alternate receivers 112 and 114 in either mode by an end plug 110 inside the end of the handle 16. The handle 16 can be secured into the alternate receivers 112 and 114 by any effective means including a spring biased pin 28 that could be installed inside the handle 16 protruding through an opening a sufficient distance to pass also through an opening 11 in the wall of the respective receiver 112 or 114. Of course, the embodiment of FIGS. 33, 34, and 35 also lends itself to applications where portability is desired as in automobile snow shovels and brooms.

Figure 37:
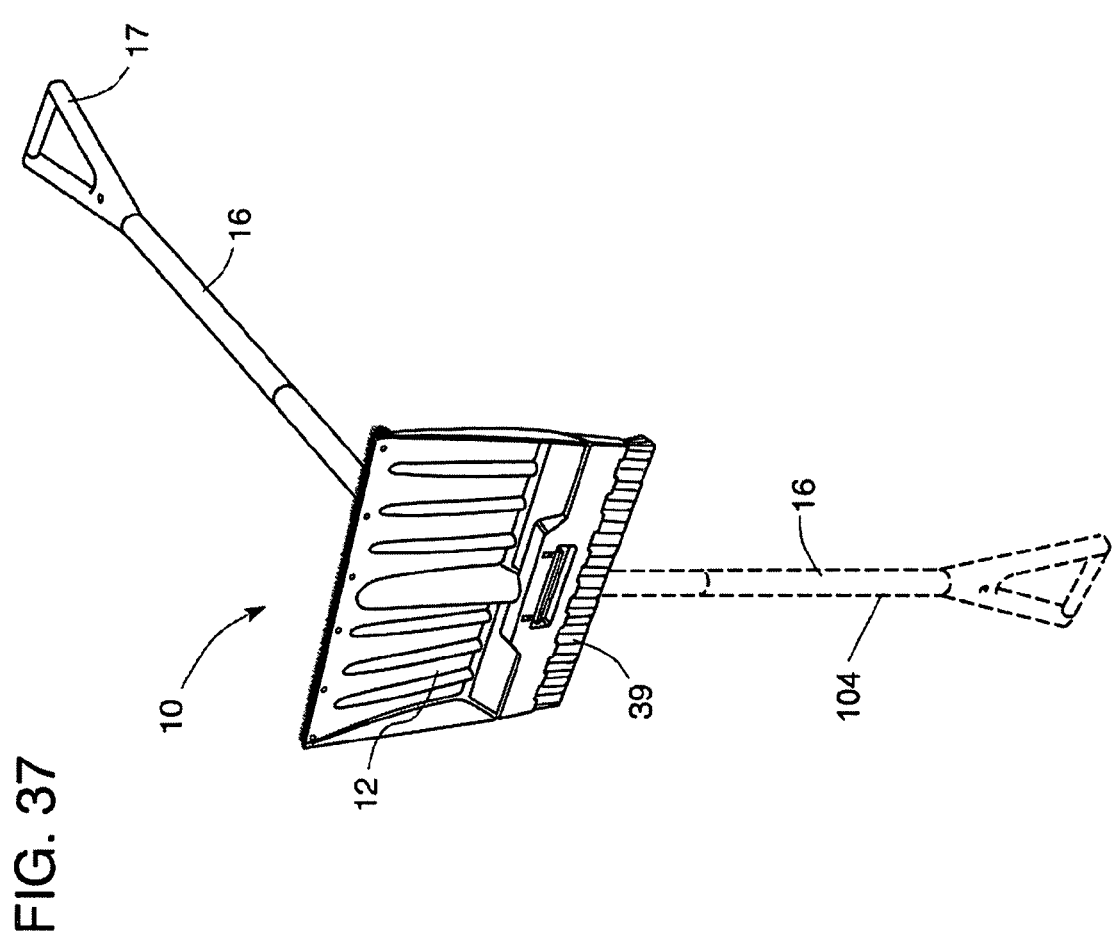
FIG. 37 is a perspective view of another combined shovel and broom arrangement with dual handle insertion arrangements.
Figure 38:
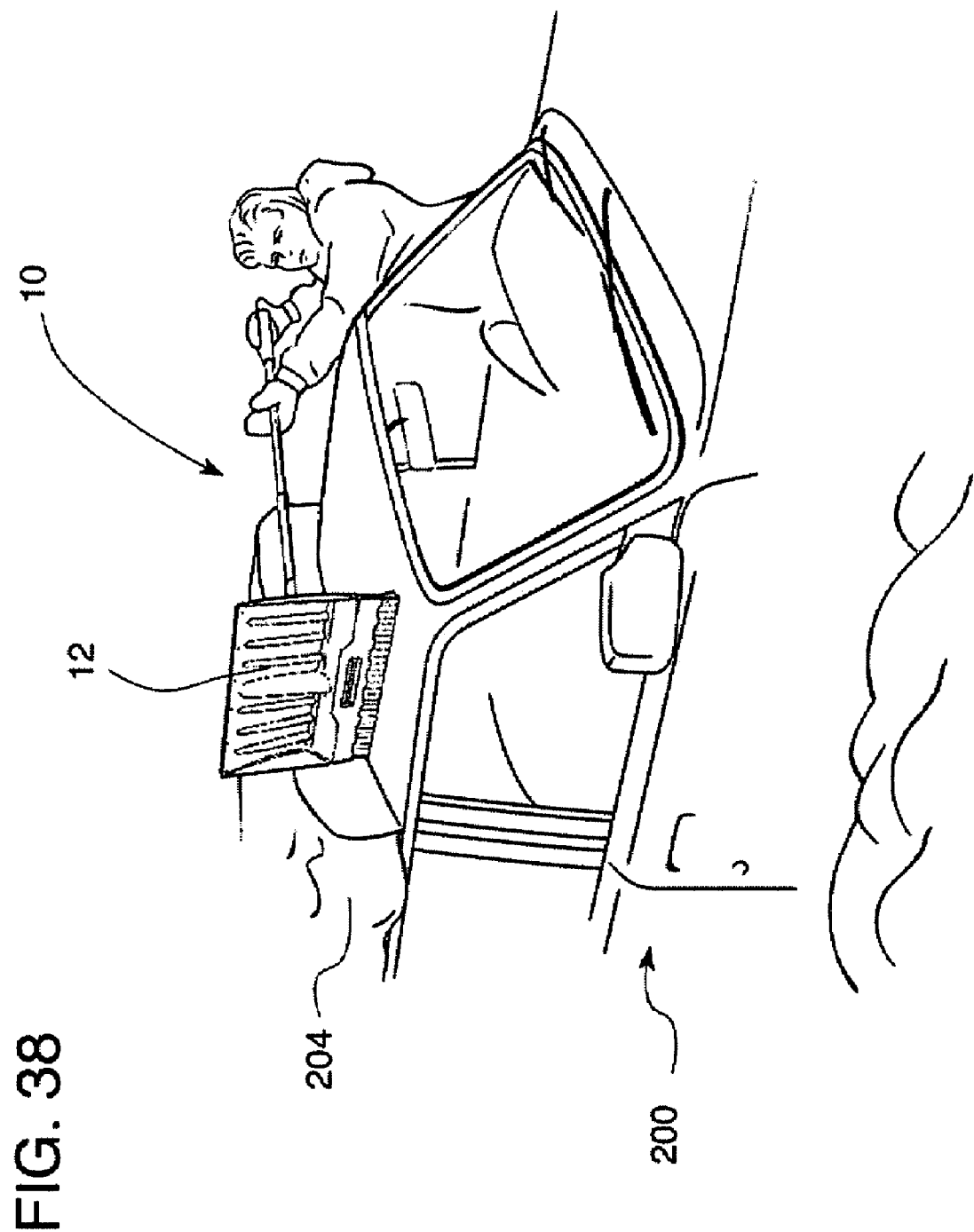
FIG. 38 is a perspective view of the combined shovel and broom arrangement of FIG. 37 in use clearing snow from a vehicle.

FIGS. 37 through 39 show a shovel blade 12 and an integral broom member 39. The mode of operation of the combined snow shovel and broom arrangement 10 is chosen by selective insertion of the elongated handle 16 into one of the two receivers 112 or 114. The first receiver 112 establishes the conventional disposition of the shovel handle 16. The second position 114 is one in which the bristles 39 are disposed substantially perpendicularly to the handle 16 to facilitate usage as a vehicle snow broom.

Figure 36:
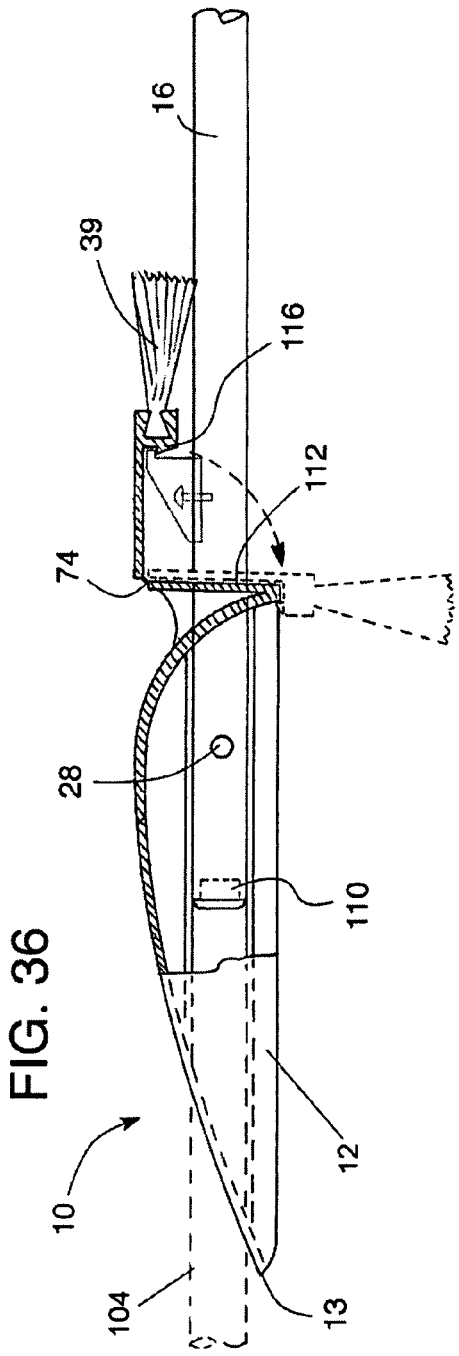
FIG. 36 is a cross sectional view of a combined shovel and broom arrangement with dual handle insertion arrangements.

In the embodiment of FIG. 36, the combined snow shovel and broom arrangement 10 incorporates a broom member 38 that can be folded flat in relation to the handle 16, such as against the obverse side of the shovel handle 16. The hinge 74 again comprises a living hinge 74, but it is again noted that numerous other hinge constructions are possible. The broom member 38 can seal the handle openings 112 and 114, which might otherwise be prone to filling with snow and ice during use. In each design, the broom member 38 can be spring or memory biased to rest in a preferred orientation. A single latching member 116 can secure the broom member 38 in both modes. However, multiple latching members 116 can be employed.

With a plurality of exemplary embodiments and details of the present invention for a combined snow shovel and snow broom arrangement disclosed, it will be appreciated by one skilled in the art that numerous changes and additions could be made thereto without deviating from the spirit or scope of the invention. This is particularly true when one bears in mind that the presently preferred embodiments merely exemplify the broader invention revealed herein. Accordingly, it will be clear that those with major features of the invention in mind could craft embodiments that incorporate those major features while not incorporating all of the features included in the preferred embodiments.

Therefore, the following claims are intended to define the scope of protection to be afforded to the inventor. Those claims shall be deemed to include equivalent constructions insofar as they do not depart from the spirit and scope of the invention. It must be further noted that a plurality of the following claims may express certain elements as means for performing a specific function, at times without the recital of structure or material. As the law demands, these claims shall be construed to cover not only the corresponding structure and material expressly described in this specification but also all equivalents thereof.

I claim as deserving the protection of Letters Patent:

1. A combined shovel and clearing tool arrangement for enabling a shoveling of debris in a shoveling disposition and a clearing of debris in a clearing tool disposition, the combined shovel and clearing tool arrangement comprising:
    a shovel comprising a handle with a proximal portion and a distal portion and a shovel blade coupled to the distal portion of the handle;
    a clearing tool member with a surface clearing portion; and
    a means for coupling the clearing tool member to the shovel to enable a selective use of the shovel for shoveling debris and the clearing tool member for clearing debris comprising a means for selectively disposing the clearing tool member in a first disposition for enabling usage of the clearing tool member in a clearing of debris therewith and a means for selectively disposing the clearing tool member in a second disposition comprising a means for movably coupling the clearing tool member to the shovel in at least one of the first disposition and the second disposition, wherein the shovel blade has a leading edge for clearing debris and a trailing edge, wherein the means for selectively disposing the clearing tool member in a first disposition comprises a means for selectively retaining the clearing tool member relative to the leading edge of the shovel blade comprising a clip arrangement.

2. The combined shovel and clearing tool arrangement of claim 1 wherein the clearing tool member comprises a hand tool taken from the group consisting of a broom member, a squeegee member, and a scraper member.

3. A combined shovel and clearing tool arrangement for enabling a shoveling of debris in a shoveling disposition and a clearing of debris in a clearing tool disposition, the combined shovel and clearing tool arrangement comprising:
    a shovel comprising a handle with a proximal portion and a distal portion and a shovel blade coupled to the distal portion of the handle;
    a clearing tool member with a surface clearing portion; and
    a means for coupling the clearing tool member to the shovel to enable a selective use of the shovel for shoveling debris and the clearing tool member for clearing debris comprising a means for selectively disposing the clearing tool member in a first disposition for enabling usage of the clearing tool member in a clearing of debris therewith and a means for selectively disposing the clearing tool member in a second disposition comprising a means for movably coupling the clearing tool member to the shovel in at least one of the first disposition and the second disposition comprising at least one elastic tether with means for coupling the elastic tether to the clearing tool member and to the shovel blade thereby to retain the clearing tool member relative to the shovel blade.

4. The combined shovel and clearing tool arrangement of claim 3 wherein the shovel blade has a leading edge for clearing debris and a trailing edge and wherein the means for selectively disposing the clearing tool member in a first disposition comprises a means for selectively retaining the clearing tool member relative to the leading edge of the shovel blade.

5. A clearing tool arrangement for selectively engaging a shovel comprising a handle with a proximal portion and a distal portion and a shovel blade coupled to the distal portion of the handle, the clearing tool comprising:
    a clearing tool member with a surface clearing portion;
    a means for selectively coupling the clearing tool member to the shovel to enable a use of the clearing tool member for clearing debris wherein the shovel blade has a leading edge for clearing debris and a trailing edge and wherein the means for selectively coupling the clearing tool member to the shovel comprises a means for selectively retaining the clearing tool member relative to the leading edge of the shovel blade; and
    a means for selectively retaining the clearing tool member relative to the handle of the shovel in a storage configuration.

6. A clearing tool arrangement for selectively engaging a shovel comprising a handle with a proximal portion and a distal portion and a shovel blade coupled to the distal portion of the handle the clearing tool comprising:
    a clearing tool member with a surface clearing portion; and
    a means for selectively coupling the clearing tool member to the shovel to enable a use of the clearing tool member for clearing debris wherein the shovel blade has a leading edge for clearing debris and a trailing edge, and wherein the means for selectively coupling the clearing tool member to the shovel comprises a means for selectively retaining the clearing tool member relative to the leading edge of the shovel blade comprising a clip arrangement.

7. The clearing tool arrangement of claim 6 wherein the clearing tool member further comprises a receiving portion for receiving at least a portion of the leading edge of the shovel blade.

8. The clearing tool arrangement of claim 6 wherein the clearing tool member comprises a hand tool taken from the group consisting of a broom member, a squeegee member, and a scraper member.

9. A clearing tool arrangement for selectively engaging a shovel comprising a handle with a proximal portion and a distal portion and a shovel blade coupled to the distal portion of the handle the clearing tool comprising:

a clearing tool member with a surface clearing portion; and a means for selectively coupling the clearing tool member to the shovel to enable a use of the clearing tool member for clearing debris, wherein the shovel blade has a leading edge for clearing debris and a trailing edge, and wherein the means for selectively coupling the clearing tool member to the shovel comprises a means for selectively retaining the clearing tool member relative to the leading edge of the shovel blade comprising at least one elastic tether with means for coupling the elastic tether to the clearing tool member and to the shovel thereby to retain the clearing tool member relative to the shovel.

* * * * *